United States Patent [19]

Suzuki et al.

[11] Patent Number: 5,005,928
[45] Date of Patent: Apr. 9, 1991

[54] OPTICAL SCANNING SYSTEM

[75] Inventors: Seizo Suzuki, Tokyo; Nobuo Sakuma, Inagi; Katsumi Yamaguchi, Fuchu; Osamu Endo, Kawasaki, all of Japan

[73] Assignee: Ricoh Company, Ltd., Tokyo, Japan

[21] Appl. No.: 376,631

[22] Filed: Jul. 7, 1989

[30] Foreign Application Priority Data

| Jul. 15, 1988 [JP] | Japan | 63-176320 |
| Dec. 29, 1988 [JP] | Japan | 63-332472 |
| Mar. 13, 1989 [JP] | Japan | 1-61876 |
| Jun. 5, 1989 [JP] | Japan | 1-142740 |

[51] Int. Cl.$^5$ ............................................. G02B 26/10
[52] U.S. Cl. ................................. 350/6.1; 350/6.8; 350/434; 350/479
[58] Field of Search .............. 350/6.1, 6.5, 6.7, 6.8, 350/6.91, 6.4, 6.9, 434, 474, 479, 480, 481; 250/235, 236

[56] References Cited

U.S. PATENT DOCUMENTS

| 4,643,516 | 2/1987 | Ogura | 350/6.5 |
| 4,712,884 | 12/1987 | Sakuma et al. | 350/6.8 |
| 4,934,772 | 6/1990 | Sakuma et al. | 350/6.5 |

FOREIGN PATENT DOCUMENTS 120112  6/1986  Japan .

Primary Examiner—Bruce Y. Arnold
Assistant Examiner—Loha Ben
Attorney, Agent, or Firm—Oblon, Spivak, McClelland, Maier & Neustadt

[57] ABSTRACT

An optical scanning system includes a light source, a coupling lens, a polygon mirror, an fθ lens, and a barrel toroidal lens. The barrel toroidal lens includes a barrel toroidal surface in which the radius of curvature thereof measured in the sub-scanning direction decreases with an increased distance from the optical axis of the barrel toroidal lens in a direction parallel to the main scanning direction.

26 Claims, 21 Drawing Sheets

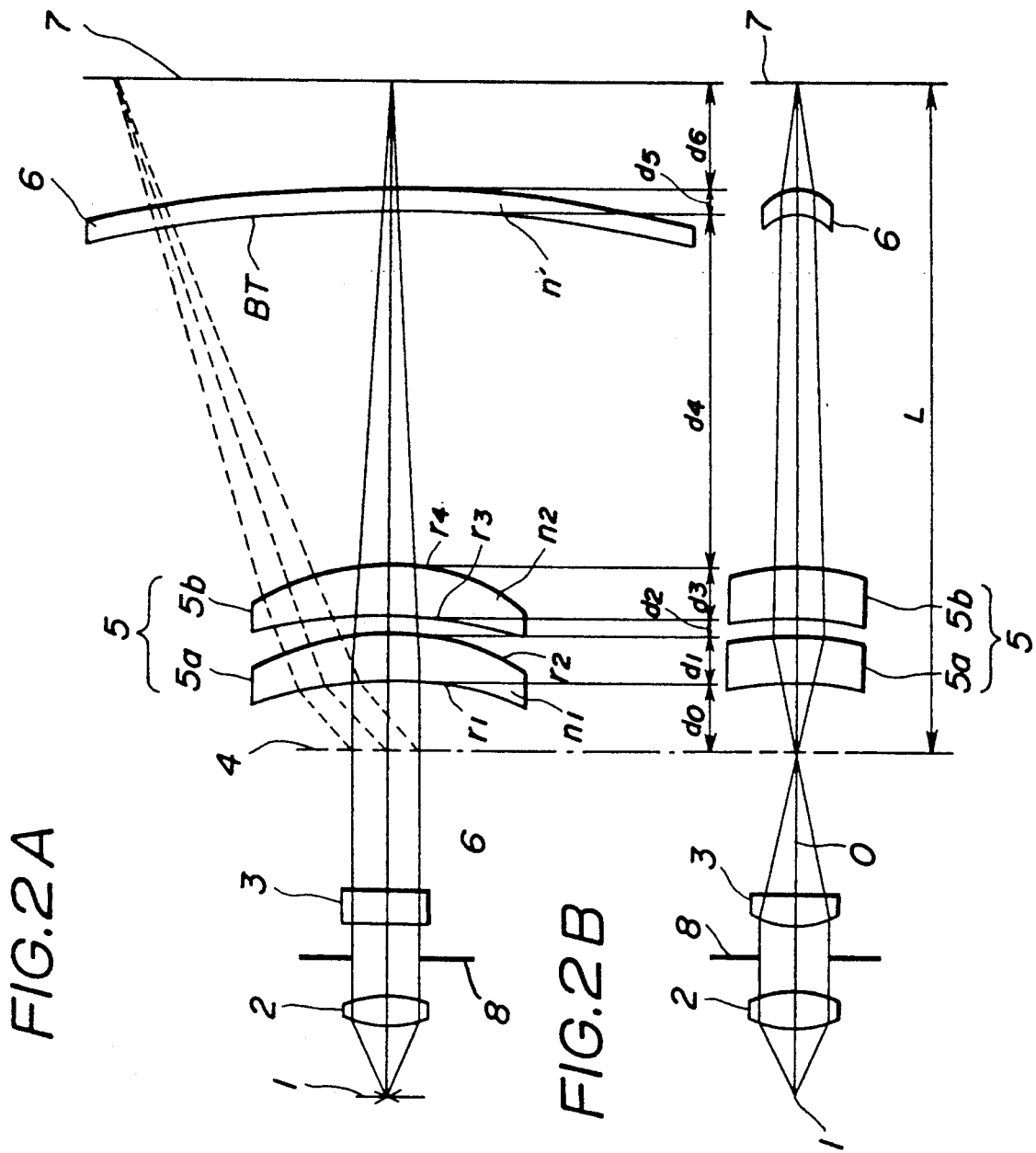

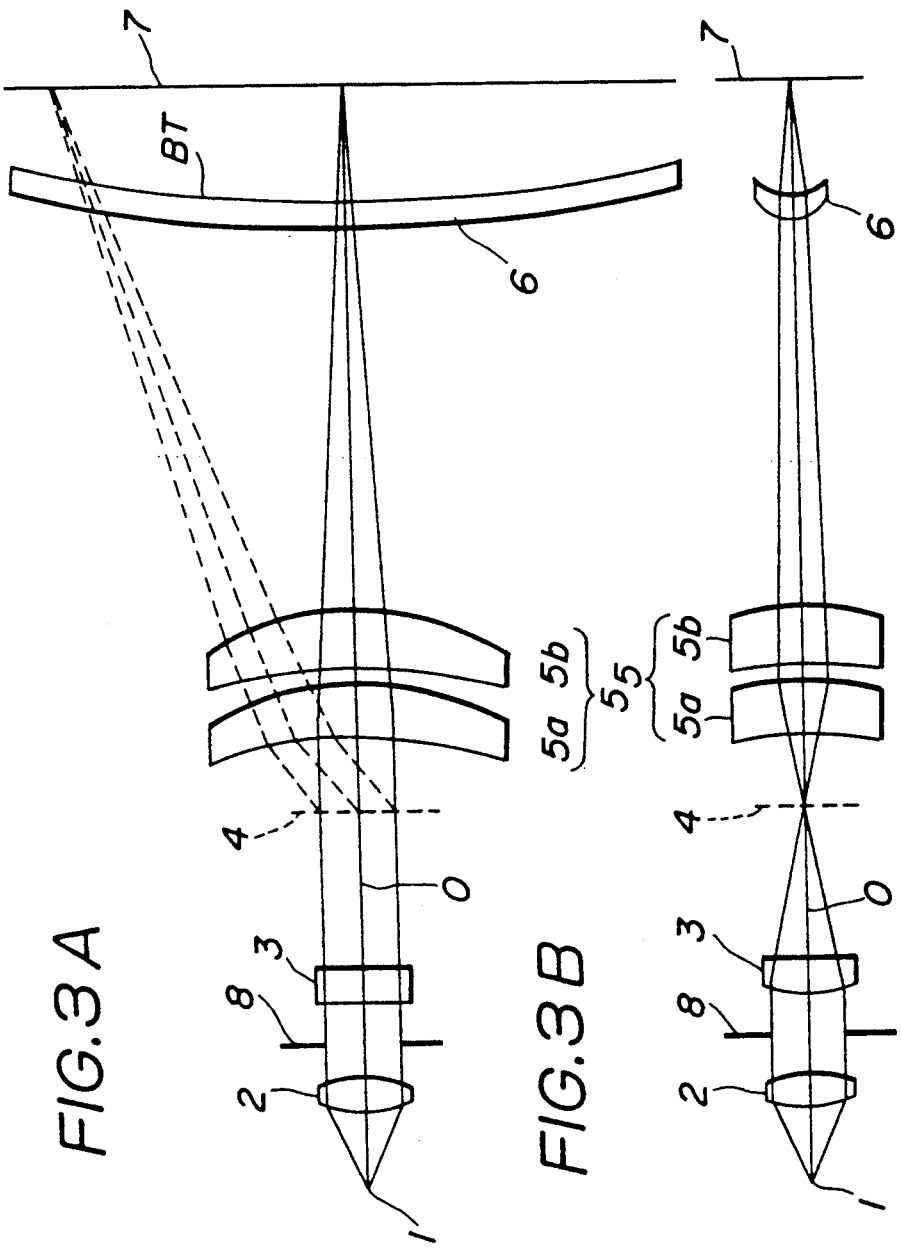

(EX. 1)

(EX. 2)

(EX. 3)

FIG.7 (EX. 4) 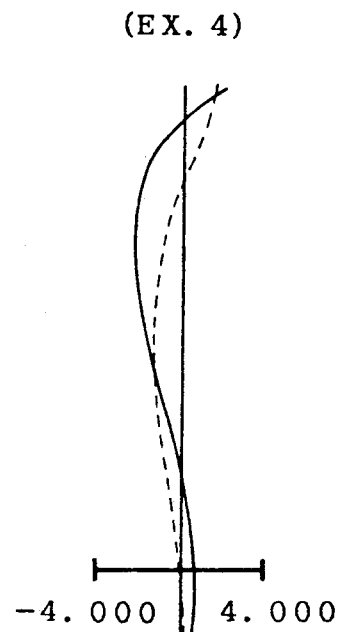
FIG.8 (EX. 5) 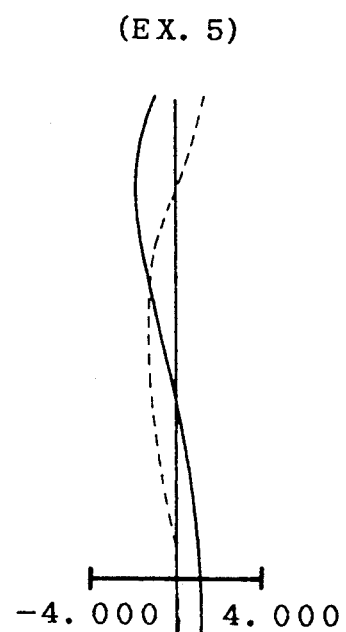
FIG.9 (EX. 6) 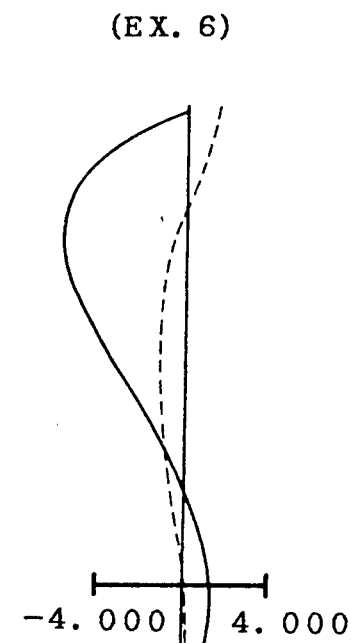

(COMP. 1)

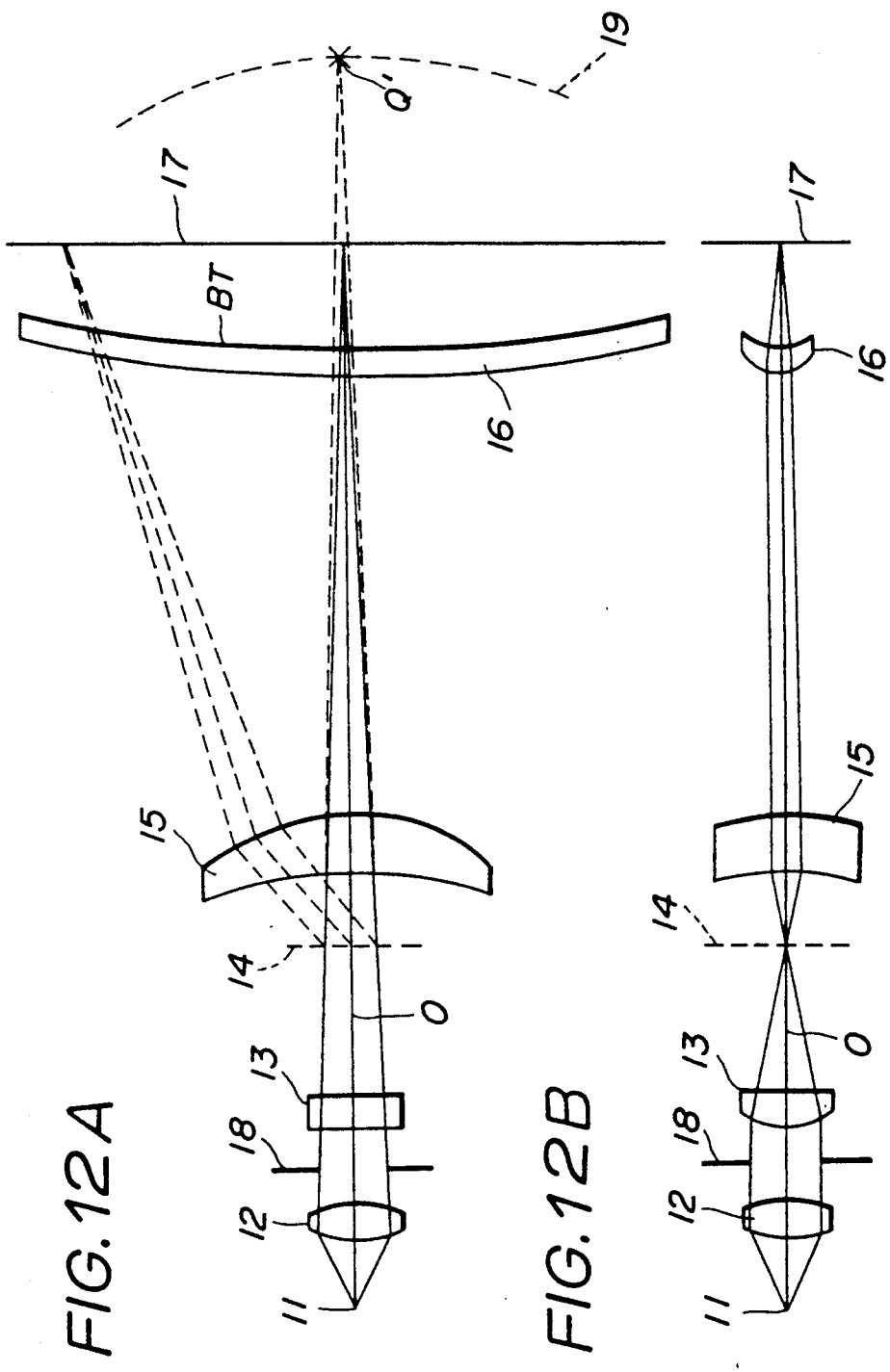

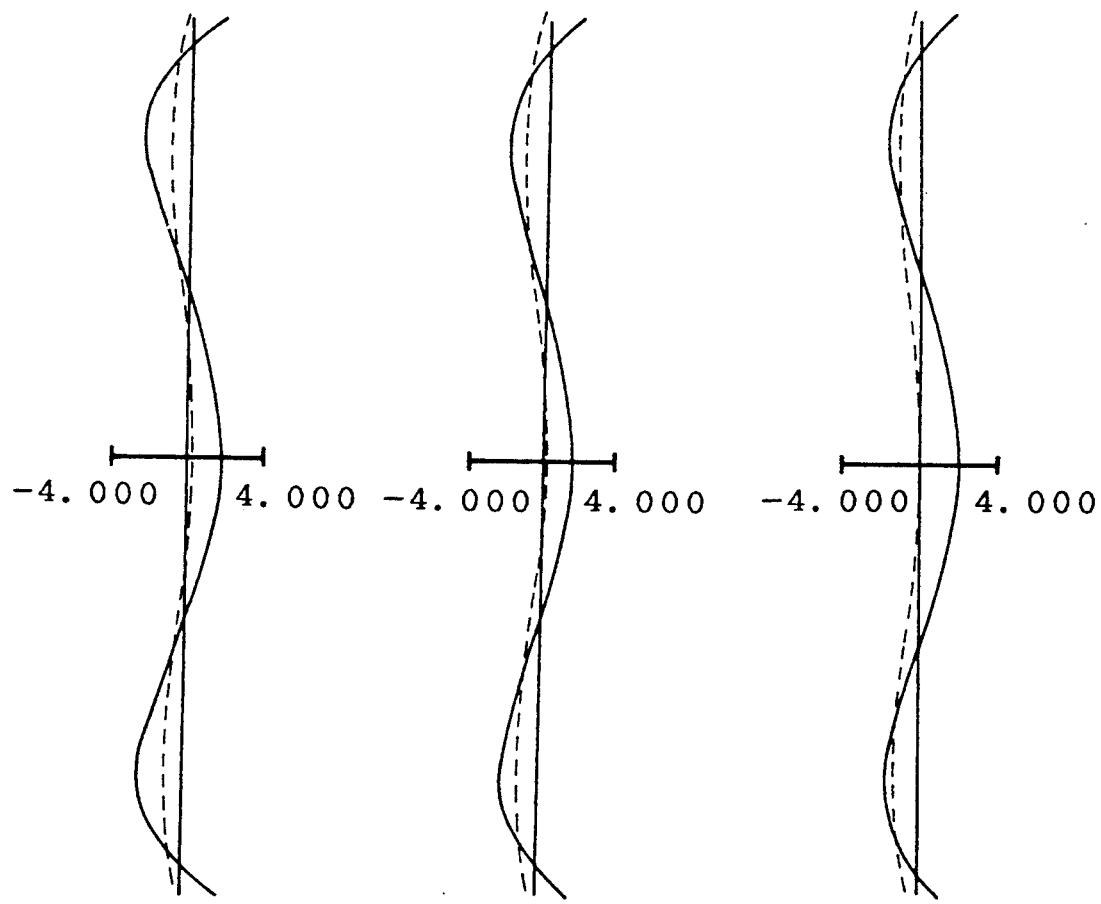

(EX. 10)

-4.000  4.000

(EX. 11)

-4.000  4.000

(EX. 12)

-4.000  4.000

(EX. 13)

-4.000　4.000

(EX. 14)

-4.000　4.000

(EX. 15)

-4.000　4.000

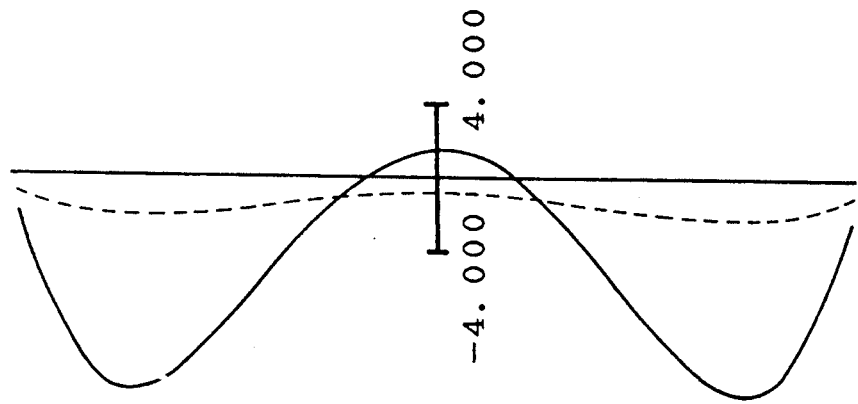
FIG.22 (EX. 16)
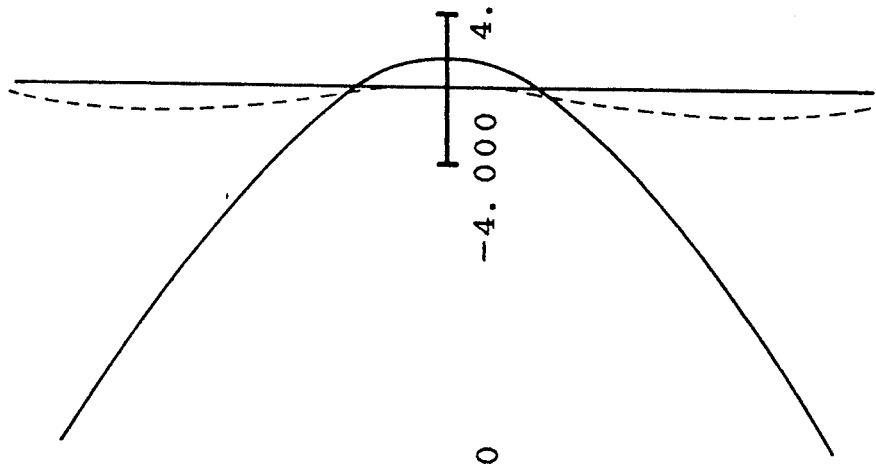
FIG.23 (COMP. 2)
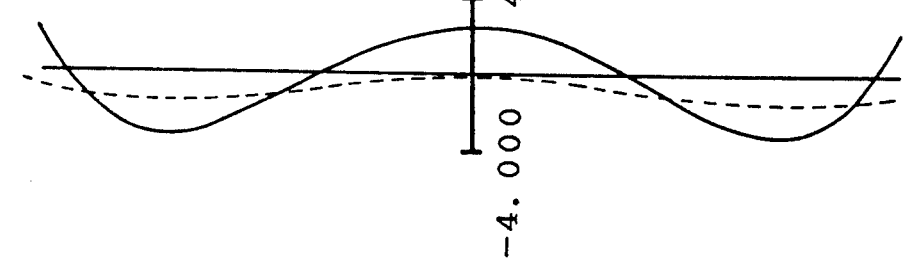
FIG.24 (COMP. 3)

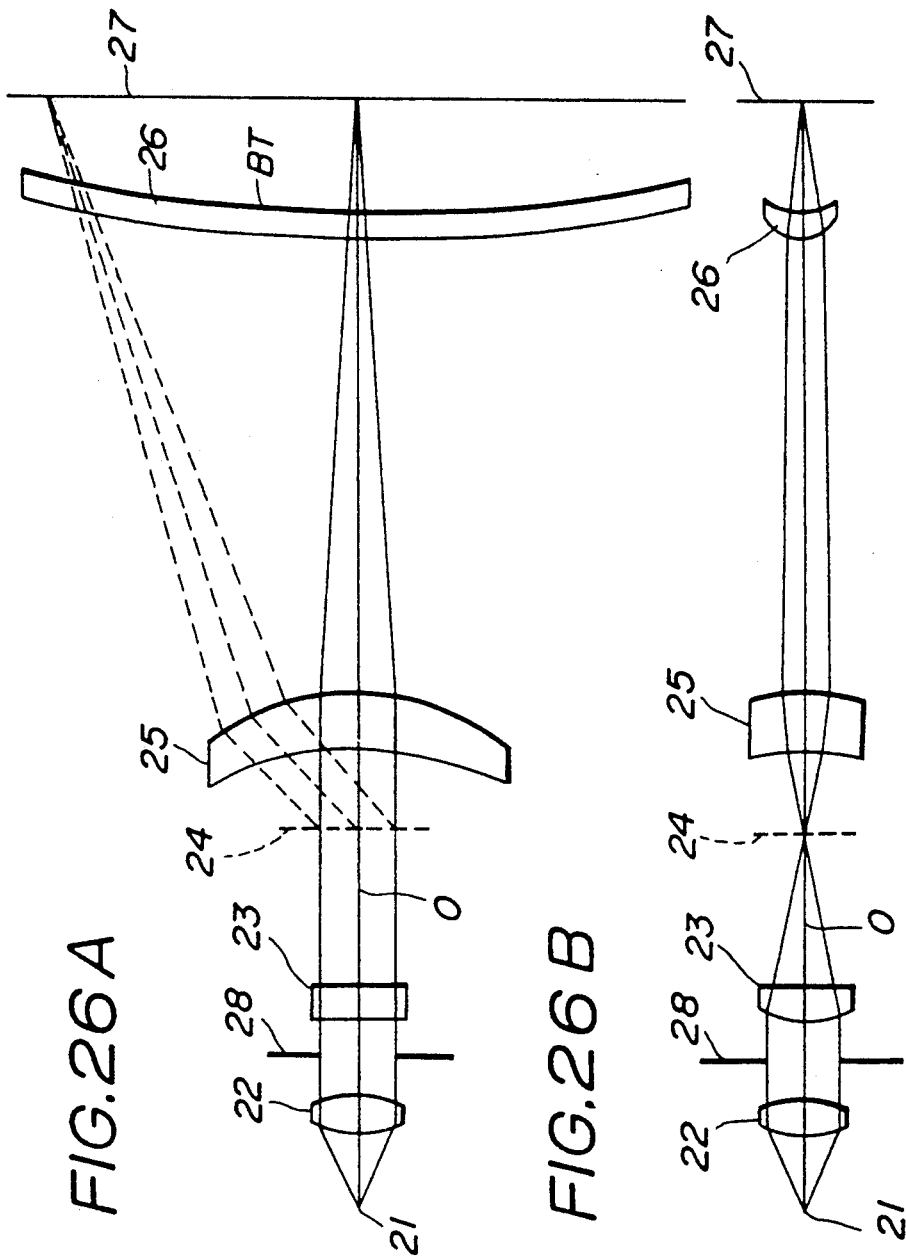

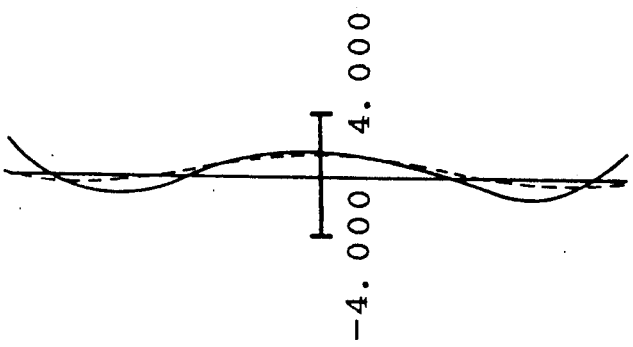
FIG.27 (Ex. 17)
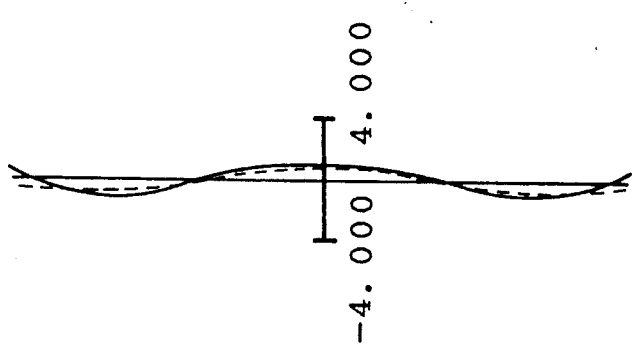
FIG.28 (Ex. 18)
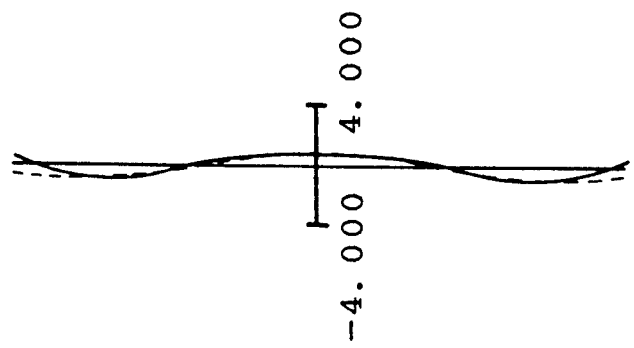
FIG.29 (Ex. 19)

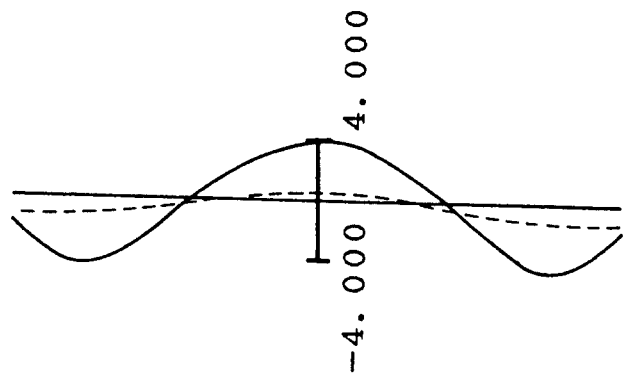
FIG.30 (EX. 20)
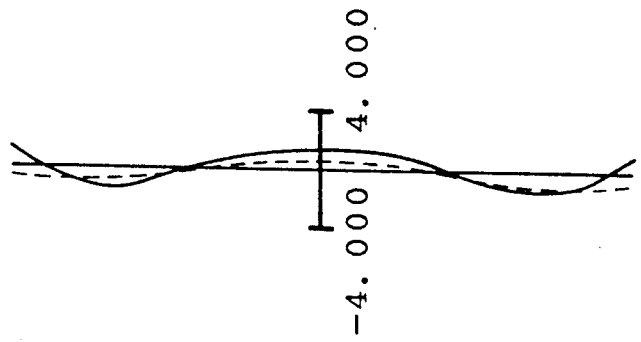
FIG.31 (EX. 21)
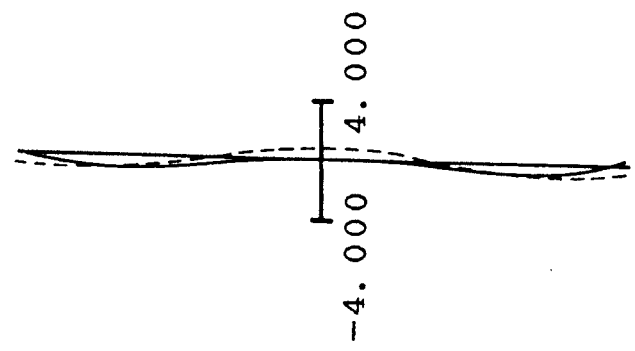
FIG.32 (EX. 22)

(EX. 23)

-4.000  4.000

(EX. 24)

-4.000  4.000

(EX. 25)

−4.000   4.000

(EX. 26)

−4.000   4.000

OPTICAL SCANNING SYSTEM

BACKGROUND OF THE INVENTION

The present invention generally relates to an optical scanning system having a barrel toroidal lens, and particularly to an optical scanning system having a barrel toroidal lens suitable for an optical scanning system employed in a laser beam printer, a digital copier, a laser facsimile machine, or the like.

As is well known, it is required to always form a light beam imaging spot of a fixed diameter on a scanned surface in order to effectively perform an optical scan. When the imaging spot diameter changes due to a variation in imaging position during optical scan, the unevenness of the size occurs in a reproduced image. One of reasons which cause variations in imaging spot diameter is curvature of field occurring in an optical scanning system of an optical scanning apparatus. An optical scanning system having a deflection device such as a rotary polygonal mirror (hereafter simply referred to as a polygon mirror) has a problem of cross scan positional error due to facet pyramidal errors of the polygon mirror. Conventionally, an improved optical scanning system is known which intends to correct the facet pyramidal error. In a known optical scanning system, an anamorphic optical scanning system is interposed between a deflection device and a scanned surface. Thereby, the conjugate relationship in view of geometrical optics is approximately established between a deflection surface provided by the deflection device and the scanned surface.

However, in the above-mentioned proposal, the refracting power measured in the sub-scanning direction is larger than the refracting power measured in the main scanning direction. For this reason, when curvature of field in the main scanning direction is corrected, a strong curvature of field in the sub-scanning direction is liable to occur.

Another improvement has been proposed in U.S. Pat. Application Ser. No. 279,096, now U.S. Pat. No. 4,934,772, which discloses a simple optical scanning apparatus which includes a single lens approximately serving as an f$\theta$ lens and a long toroidal lens. The long toroidal lens used in the proposed scanning system has the function of correcting errors due to curvature of field in the main and sub scanning directions. It is preferable to position the long toroidal lens separately from a scanned surface as much as possible in terms of the utility efficiency of light and mechanical arrangement of optical elements. However, in the long toroidal lens positioned as mentioned above, it becomes difficult to correct curvature of field occurring in the sub-scanning direction when trying to achieve a wider field angle.

Still another example has been proposed in Japanese Laid-Open Patent Application No. 61-120112, which discloses a modified cylindrical lens having a saddle-shaped lens surface as a convex lens surface. This is effective to correct curvature of field occurring in the sub-scanning direction, which prevents the unevenness of the imaging spot diameter.

However, it is very difficult to form the above-mentioned modified cylindrical lens, as described below. The modified lens having a saddle-shaped lens surface is a long lens. Therefore, the shaping and production by using synthetic resin is the practical method of forming the modified cylindrical lens. However, it is very difficult to form a die having a complementary concave surface. Generally, a die having a concave surface is formed by first forming a die having a corresponding convex surface and then transferring the convex surface to a member by casting. However, this process cannot provide a precise surface. It is noted that the above-mentioned Japanese laid-open patent application discloses a cutting production method as a method of forming the saddle-shaped lens surface. However, the mass productivity of cutting production is poor in production of lenses. This prevents the production of a less expensive optical scanning system and thus an economical optical scanning apparatus.

SUMMARY OF THE INVENTION

It is therefore a general object of the present invention to provide an improved optical scanning system in which the above-mentioned disadvantages are eliminated.

A more specific object of the present invention is to provide an optical scanning system in which curvature of field occurring in the sub-scanning direction is effectively corrected and is suitable for mass production.

Another object of the present invention is to provide a less expensive optical system of a simple structure.

The above objects of the present invention can be achieved by an optical scanning system comprising light source means for emitting a light flux; coupling lens means for coupling the light flux emitted from the light source means; deflection means for deflecting the light flux from the coupling lens means in a main scanning direction; optical scanning lens means for converging the deflected light flux so as to scan a surface with an approximately constant velocity; and correcting lens means, cooperating with the optical scanning lens means, for further converging, on the scanned surface, the light flux from the optical scanning lens in the main scanning direction and approximately coupling the deflection means and the scanned surface with a conjugate relationship in view of geometrical optics, the correcting lens means having an optical axis. The correcting lens means includes a barrel toroidal surface in which the radius of curvature thereof measured in a sub-scanning direction perpendicular to the main scanning direction decreases with an increased distance from the optical axis of the correcting lens means in a direction parallel to the main scanning direction.

Other objects, features and advantages of the present invention will become apparent from the following detailed description when read in conjunction with the accompanying drawings.

BRIEF DESCRIPTION OF THE DRAWINGS

FIGS. 2A and 2B are expanded views of a first embodiment of the present invention;

FIGS. 3A and 3B are expanded views of a variation of the first embodiment;

FIGS. 4 through 9 are graphs illustrating curvature of field observed in optical scanning systems constructed based on the first embodiment;

FIGS. 12A and 12B are expanded views of a variation of the second embodiment shown in FIGS. 11A and 11B;

FIGS. 13 through 22 are graphs illustrating curvature of field observed in optical scanning systems constructed based on the second embodiment;

FIGS. 23 and 24 are graphs illustrating curvature of field observed in comparison examples;

FIGS. 26A and 26B are expanded views of a variation of the third embodiments shown in FIGS. 25A and 25B;

FIGS. 27 through 32 are graphs illustrating curvature of field observed in optical scanning systems constructed based on the third embodiment;

DESCRIPTION OF THE PREFERRED EMBODIMENTS

Figure 1A:
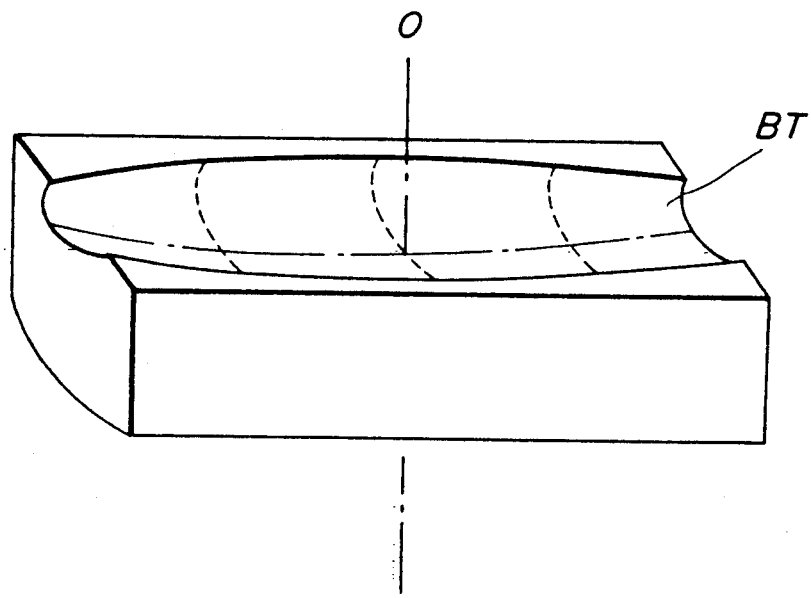
FIG. 1A is a perspective view of a barrel toroidal lens used in the present invention.
Figure 1B:
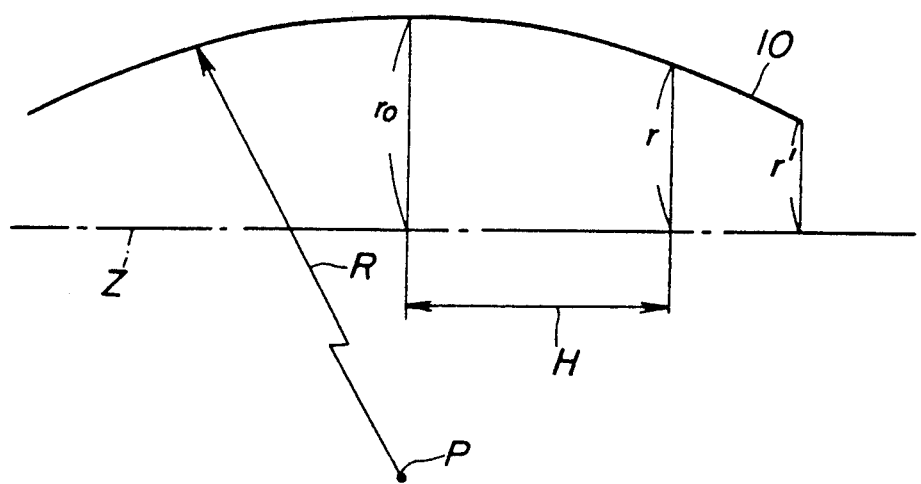
FIG. 1B is a view illustrating a barrel toroidal surface of the barrel toroidal lens shown in FIG. 1A.

A description is given of a barrel toroidal surface employed in the present invention with reference to FIGS. 1A and 1B. FIG. 1A is a perspective view of a lens which has a barrel toroidal surface BT as a concave surface, or a barrel toroidal lens. The barrel toroidal surface BT has negative refracting power because it is a concave surface. In the barrel toroidal surface BT of the invention has the radius of curvature in the sub-scanning direction, which decreases with an increased distance from an optical axis 0 in a main scanning correspondence direction (left and right direction in FIG. 1A). A main scanning correspondence direction is defined as a direction which includes the main scanning direction as well as a direction parallel to the main scanning direction. Therefore, negative power of the barrel toroidal surface BT increases with an increase in separation from the optical axis 0 in the main scanning direction. Correspondingly, a light flux passing through the barrel toroidal surface BT has weakened convergence in the sub-scanning direction with increased distance from the optical axis 0. The above-mentioned function makes it possible to effectively correct curvature of field occurring in the sub-scanning direction.

Conventionally, a long cylindrical lens has been used for correcting curvature of field. A light beam is deflected on a deflection surface of a deflection device, and enters a long cylindrical lens. The light beam entering the long cylindrical lens is further inclined with respect thereto as the deflection angle increases. As a result, positive power of a long cylindrical lens is seemingly larger than suitable refracting power thereof, with an increase in separation from the optical axis. This frequently causes a strong circular arc curvature of field, the concave curvature of which faces the deflection device.

The barrel toroidal surface BT shown in FIG. 1A has the function of providing the incident flux with weakened convergence as the deflection angle increases. This functions to effectively offset the above-mentioned over positive power to thereby provide excellent correction of curvature of field. It is noted that when the illustrated lens is formed of synthetic resin, a die having a convex surface can be used.

As shown in FIG. 1B, the barrel toroidal surface BT is a curved surface formed by rotating a circular arc curve 10 around a line Z served as a rotation axis, which exists in the same plane as the circular arc curve 10 and does not pass the center P of curvature of the circular arc curve 10. In this case, the following formula is obtained:

$$|r| = |r_0| - |R| + \sqrt{R^2 - H^2} \quad (1)$$

where R is the radius of the circular arc curve 10, and r is the distance between the rotation axis Z and the circular arc curve 10 with respect to a distance H from a position on the rotation axis Z relating to $r_0$, which is the maximum value of the distance r. The sign of each of the parameters is determined as follows. When the center of curvature of the circular arc curve 10 of the radius R is positioned closer to a scanned surface than the barrel toroidal surface BT, $r > 0$, $r_0 > 0$, and $R > 0$. On the other hand, $r < 0$, $r_0 < 0$, and $R < 0$, when the above-mentioned center of curvature is positioned closer to a deflection device than the barrel toroidal surface BT. In the case of the present invention, $|r| \leq |r_0|$.

The shape of the circular arc curve 10 can be represented by a well-known polynomial expression used for describing an aspherical surface, and factors used therein can be suitably selected.

A description is given of a first preferred embodiment of the present invention.

FIGS. 2A and 2B illustrate an optical system of a first preferred embodiment of the present invention. The illustrated optical system is expanded along an optical path of a main beam extending from an optical source to a scanned surface. FIG. 2A is viewed from the sub-scanning direction. In this figure, the main scanning direction corresponds to the up-down direction along a scanned surface 7. FIG. 2B is viewed from the main scanning direction. In FIG. 2B, the direction perpendicular to the drawing corresponds to the main scanning direction, and the up-down direction corresponds to the sub-scanning direction.

A light source 1 is formed by a laser diode (LD) or a light-emitting diode (LED). A light flux emitted from the light source 1 is collimated through a collimating lens 2. The collimated light flux is shaped by an aperture 8 so as to have a predetermined shape in cross section. The light flux from the aperture 8 enters a cylindrical lens 3. The cylindrical lens 3 has positive power in the only sub-scanning direction. Therefore, the collimated light flux from the cylindrical lens 3 is converged on a deflection surface 4 of a deflection device so as to form a long ellipse, the major axis of which is directed to the main scan corresponding direction. The main scan corresponding direction is a direction parallel to the main scanning direction obtained when the path along the optical axis extending from the light source 1 to the scanned surface 7 is expanded in the same plane. A sub-scan corresponding direction is a direction parallel to the sub-scanning direction in the above-mentioned expanded plane. The deflection device providing the deflection surface 4 is a polygon mirror in the first embodiment. The light flux from the cylindrical lens 3 is reflected on a reflection surface thereof served as the deflection surface 4. The polygon mirror is rotated at a constant angular velocity, and the light flux from the cylindrical lens 3 is deflected with the rotation of the deflection surface 4. Therefore, the deflection starting point for the light flux is a reflection position on the deflection surface 4.

A scanning system is interposed between the deflection surface 4 and the scanned surface 7. The illustrated optical scanning system includes an optical scanning lens means such as an f$\theta$ lens 5 and a correcting lens means such as a barrel torordal lens 6. A letter "0" indicates an optical axis of the system. The f$\theta$ lens 5 is made up of two lenses 5a and 5b, and functions to focus, in the main scan corresponding direction (FIG. 2A), the incident light flux on the scanned surface 7. That is, viewed from the sub-scanning direction, the f$\theta$ lens 5 forms an image-at-infinity existing on the object side, on the scanned surface 7. The focal length in the above image formation corresponds to the focal length o the optical scanning system in the main scanning plane.

On the other hand, in the sub-scan corresponding direction, the f$\theta$ lens 5 and the barrel toroidal lens 6 cooperate so as to approximately couple the deflection starting point and the scanned surface 7 with the conjugate relationship in view of geometrical optics. Therefore, in FIG. 2B, an image of the aforementioned ellipse formed at the deflection starting point is formed on the scanned surface 7 due to the function of the f$\theta$ lens 5 and the barrel toroidal lens 6. In this manner, the light flux from the optical source 1 is imaged on the scanned surface 7 in the shape of a spot, and the scanned surface 7 is scanned by the imaging spot of the light flux deflected by the deflection device.

As described previously, the f$\theta$ lens 5 is made up of two lenses 5a and 5b, which have the following parameters. In the following description, $r_i$ (i=1, 2, 3...) is the radius of curvature of the i-th lens surface appearing from the deflection surface 4. In FIG. 2A, there are illustrated four radii of spherical curvature $r_1$, $r_2$, $r_3$ and $r_4$. Similarly, $d_i$ (i=0, 1, 2, 3...) is a surface separation distance, which sequentially appears from the deflection surface 4. In FIG. 2A, there are illustrated surface separation distances $d_0$ to $d_6$. Further, $n_j$ (j=1, 2, 3...) is the refractive index of the j-th lens sequentially appearing from the deflection surface 4. In FIG. 2A, there are two refractive indices $n_1$ and $n_2$. Table 1 shows values of the above-mentioned parameters.

TABLE 1

| i | $r_i$ | $d_i$ | j | $n_j$ |
|---|---|---|---|---|
| 1 | −186.0 | 12.7 | 1 | 1.51118 |
| 2 | −103.0 | 3.4 | | |
| 3 | −440.0 | 18.6 | 2 | 1.76605 |
| 4 | −99.484 | | | |

These values (a unit of millimeter) are calculated, assuming that the distance $d_0$ between the deflection surface 4 and the first surface of the lens 5a out of the f$\theta$ lens is equal to 26.0 mm, and the focal length of the f$\theta$ lens 5 is set equal to 120.0 mm. The f$\theta$ characteristic of the f$\theta$ lens 5 is equal to or less than ±0.5%.

The barrel toroidal lens 6 is a lens which has the aforementioned barrel toroidal surface BT as a concave surface. In FIGS. 2A and 2B, the barrel toroidal surface BT of the lens 6 faces the f$\theta$ lens 5. A surface of the lens 6 opposite to the barrel toroidal surface BT thereof is a convex lens surface in the sub-scanning direction, and faces the scanned surface 7. It is possible to employ a variety of shapes of the lens surface opposite to the barrel toroidal surface BT. For example, a conventional toroidal surface and a cylindrical surface and so on, a flat plane can be used.

Six examples of the barrel toroidal lens 6 are shown in Tables 2 through 7. In these tables, L is the separation distance between the deflection surface 4 and the scanned surface 7, and $d_4$ is the separation distance between the fourth lens surface of the f$\theta$ lens 5 (that is, the lens surface of the second lens 5b opposite to the barrel toroidal lens 6) and the lens surface of the barrel toroidal lens 6 opposite to the f$\theta$ lens 5. A parameter $d_5$ is the thickness of the barrel toroidal lens 6, and $d_6$ is the separation distance between the scanned surface 7 and the lens surface of the barrel toroidal lens 6 opposite thereto. A parameter n' is the refractive index of the barrel toroidal lens 6. The barrel toroidal surface BT is defined by the aforementioned parameters $r_0$ and R in formula (1). The radius of curvature of the opposed surface of the barrel toroidal lens 6 measured in the main scanning direction is represented as $r_{kx}$, and the radius of curvature thereof measured in the sub-scanning direction is represented by $r_{ky}$. It is noted that k=6, when the barrel toroidal surface BT is opposite to the f$\theta$ lens 5. On the other hand, k=5, when the barrel toroidal surface BT of the barrel toroidal lens 6 faces the scanned surface 7, as shown in FIGS. 3A and 3B. The barrel toroidal surface BT may face the f$\theta$ lens 5 and alternatively face the scanned surface 7. Tables 2 to 4 relate to the arrangement of FIGS. 3A and 3B, and Tables 5 to 7 relate to the arrangement of FIGS. 2A and 2B. In the examples 1 to 6, the deflection angle is equal to 105.6 degrees, and the effective write width is approximately 219.4 mm. It follows that the present optical system is of an approximately wide field angle.

TABLE 2

| (Example 1) | | | | |
|---|---|---|---|---|
| L | $d_4$ | $d_5$ | $d_6$ | n' |
| 182.5 | 58.8 | 3.0 | 60.0 | 1.48519 |
| $r_{5x}$ | $r_{5y}$ | $r_0$ | R | |
| 1000 | 10.85 | 20.00 | 1000 | |

TABLE 3

| (Example 2) | | | | |
|---|---|---|---|---|
| L | $d_4$ | $d_5$ | $d_6$ | n' |
| 182.5 | 88.8 | 3.0 | 30.0 | 1.48519 |
| $r_{5x}$ | $r_{5y}$ | $r_0$ | R | |
| 1500 | 8.50 | 20.00 | 1500 | |

TABLE 4

| (Example 3) | | | | |
|---|---|---|---|---|
| L | d | $d_5$ | $d_6$ | n' |
| 182.5 | 28.8 | 3.0 | 90.0 | 1.48519 |
| $r_{5x}$ | $r_{5y}$ | $r_0$ | R | |
| 700 | 11.65 | 20.00 | 700 | |

TABLE 5

| (Example 4) | | | | |
|---|---|---|---|---|
| L | $d_4$ | $d_5$ | $d_6$ | n' |
| 182.5 | 58.8 | 3.0 | 60.0 | 1.48519 |
| $r_0$ | R | $r_{6x}$ | $r_{6y}$ | |

TABLE 5-continued (Example 4)

| L | $d_4$ | $d_5$ | $d_6$ | n' |
|---|---|---|---|---|
| −20.00 | −850 | −850 | −10.5 | |

TABLE 6

(Example 5)

| L | $d_4$ | $d_5$ | $d_6$ | n' |
|---|---|---|---|---|
| 182.5 | 88.8 | 3.0 | 30.0 | 1.48519 |
| $r_0$ | R | $r_{6x}$ | $r_{6y}$ | |
| −20.00 | −800 | −800 | −8.00 | |

TABLE 7

(Example 6)

| L | $d_4$ | $d_5$ | $d_6$ | n' |
|---|---|---|---|---|
| 182.5 | 28.8 | 3.0 | 90.0 | 1.48519 |
| $r_0$ | R | $r_{6x}$ | $r_{6y}$ | |
| −20.00 | −700 | −700 | −11.50 | |

A comparison example (comparison example 1) is shown in Table 8, which relates to an optical scanning system constructed by replacing the barrel toroidal lens 6 with a conventional long toroidal lens. In this case, $r_{5x}$ and $r_{5y}$ are the radii of curvature of the lens surface of the long toroidal lens facing the fθ lens 5 in the main and sub scanning directions, respectively. And, $r_{6x}$ and $r_{y6}$ are the radii of curvature of the lens surface of the long toroidal lens facing the scanned surface 7 in the main and sub scanning directions, respectively. The refractive index of the long toroidal lens is represented by n.

Table 8

(comparison example 1)

| L | $d_4$ | $d_5$ | $d_6$ | n |
|---|---|---|---|---|
| 182.5 | 58.8 | 3.0 | 60.0 | 1.48519 |
| $r_{5x}$ | $r_{5y}$ | $r_{6x}$ | $r_{6y}$ | |
| 200 | 21.0 | 200 | ∞ | |

Figure 4:
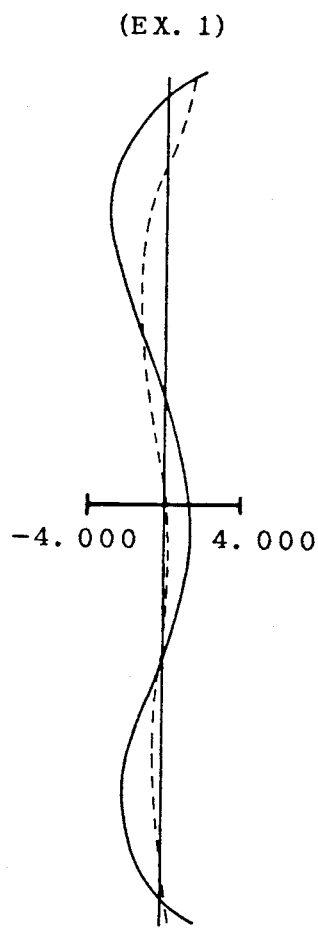

FIG. 4 illustrates a curvature of field related to the aforementioned example 1 in which the separation distance $d_6$ between the barrel toroidal lens 6 and the scanned surface 7 is set equal to 60 mm. In this case, the curvature of field is approximately equal to 4 mm, and is therefore small. A solid line shown in FIG. 4 represents a curvature of field observed in the sagittal direction, namely, the sub-scanning direction, and a broken line represents a curvature of field observed in the meridional direction, namely, the main scanning direction. The above holds true for other views of curvature of field, which will be described later.

Figure 5:
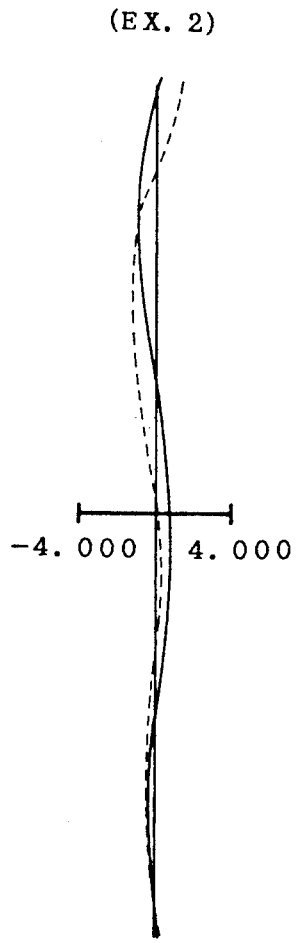

FIG. 5 illustrates a curvature of field related to example 2 in which the barrel toroidal surface BT faces the scanned surface 7 as in the case of example 1. In example 2, the separation distance $d_6$ is set equal to 30 mm so that the barrel toroidal lens 6 is positioned closer to the scanned surface 7 than that of example 1. The observed curvature of field is smaller than that for example 1.

Figure 6:
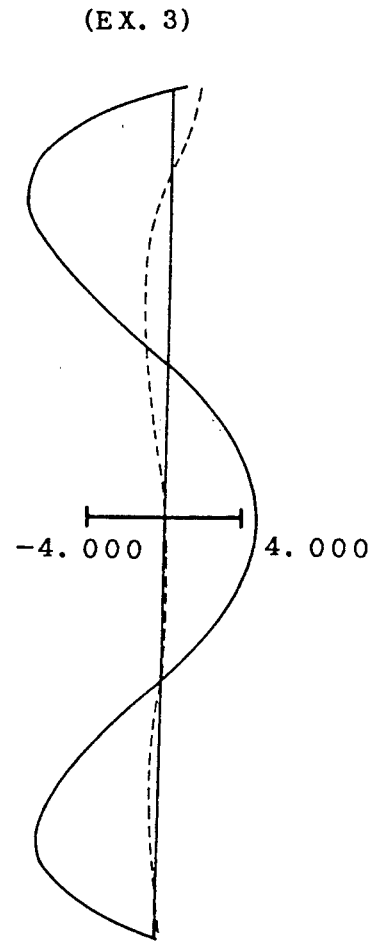

FIG. 6 illustrates a curvature of field related to example 3 in which the barrel toroidal surface BT is opposite to the scanned surface 7 in the same way as that for example 1. In example 3, the separation distance $d_6$ is set equal to 90 mm so that the barrel toroidal lens 6 is positioned away from the scanned surface 7, as compared with the separation distance for example 1. The observed curvature of field in example 3 is slightly larger than those in examples 1 and 2.

FIG. 7 illustrates a curvature of field related to example 4 in which the barrel toroidal surface BT is opposite to the fθ lens 5, and the separation distance $d_6$ is set equal to 60 mm. The observed curvature of field in example 4 is extremely small.

FIG. 8 illustrates a curvature of field related to example 5 in which the barrel toroidal surface BT is opposite to the fθ lens 5 and the separation distance $d_6$ is set equal to 30 mm. The observed curvature of field in example 5 is extremely small.

FIG. 9 illustrates a curvature of field related to example 6 in which the barrel toroidal surface BT is opposite to the fθ lens 5 and the separation distance $d_6$ is set equal to 90 mm. The observed curvature of field in example 6 is slightly larger than those for examples 4 and 5. However, the curvature of field related to example 6 is slightly smaller than that for example 3.

It can be seen from the comparison between FIGS. 4 through 6 and comparison between FIGS. 7 through 9 that a slightly better curvature of field is obtained when the barrel toroidal lens 6 is arranged so that the barrel toroidal surface BT thereof faces the fθ lens 5.

Figure 10:
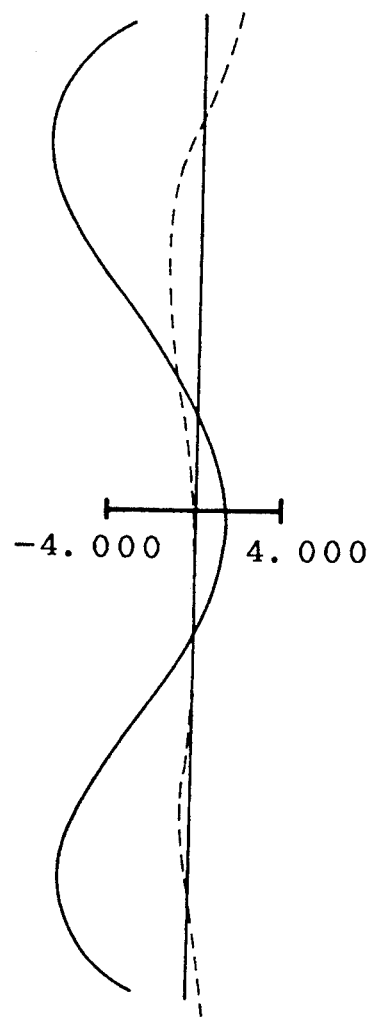
FIG. 10 is a graph illustrating curvature of field observed in a comparison example.

FIG. 10 illustrates a curvature of field related to comparison example 1 in which the separation distance $d_6$ is set equal to 60 mm. The illustrated curvature of field is almost the same as that for example 3 or 6. It can be seen from the above that the barrel toroidal surface BT can provide good curvature-of-field correction effects even when it is located considerably apart from the scanned surface 7. Therefore, the degree of freedom in positioning the barrel toroidal lens 6 is higher than that for a conventional long toroidal lens.

Figures 11A, 11B:
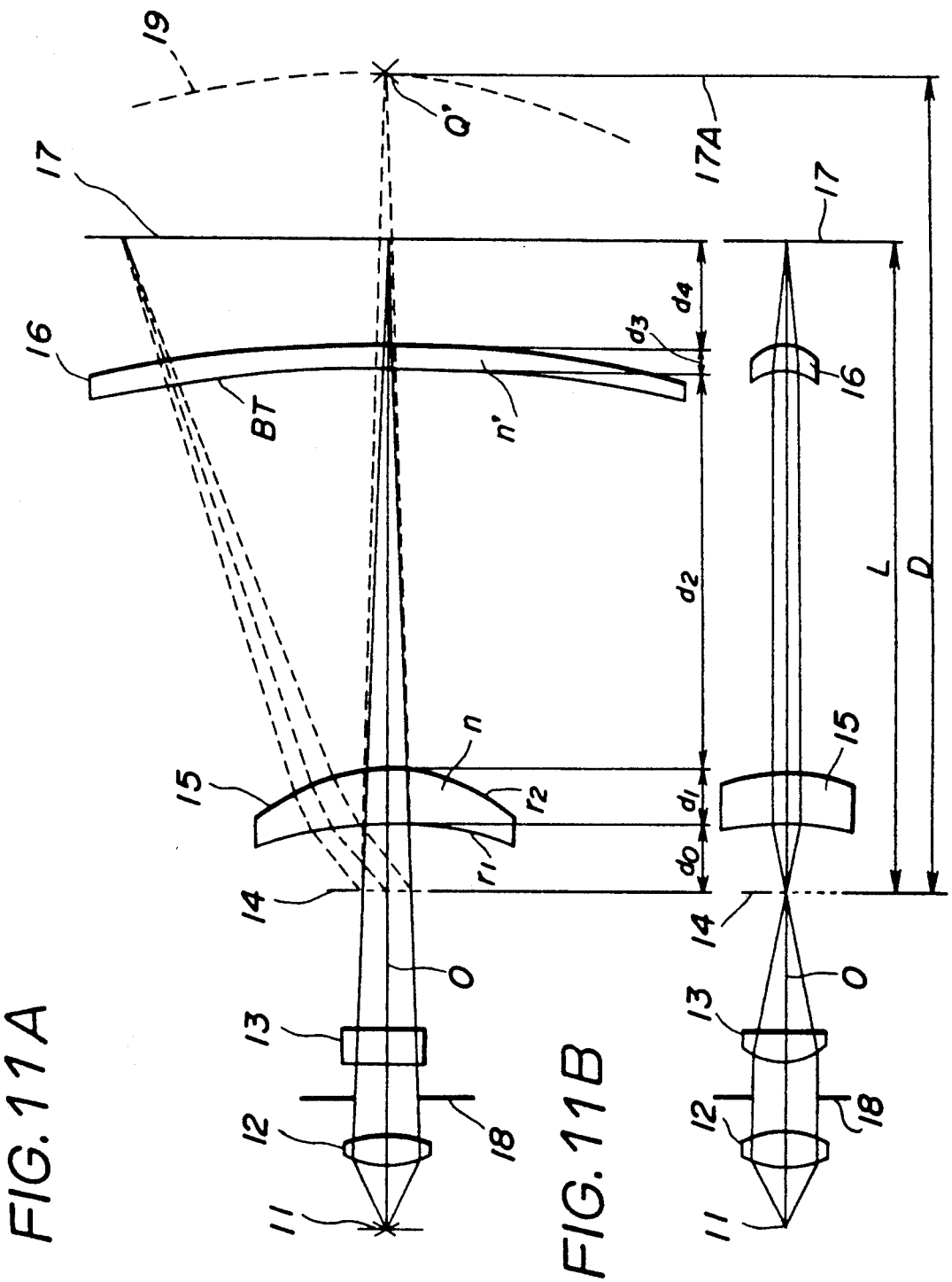
FIGS. 11A and 11B are expanded views of a second embodiment of the present invention.
Figure 16:
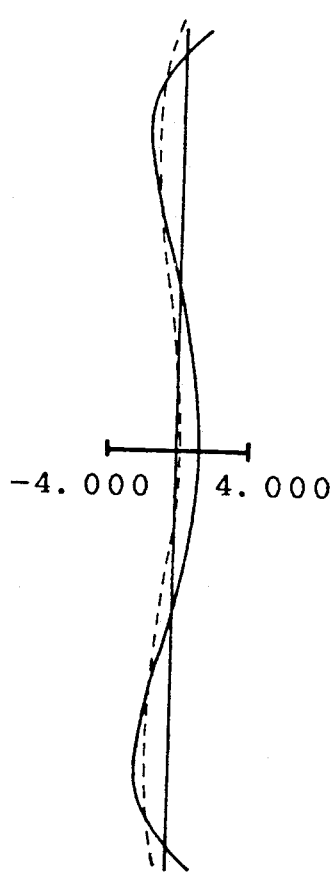
Figure 17:
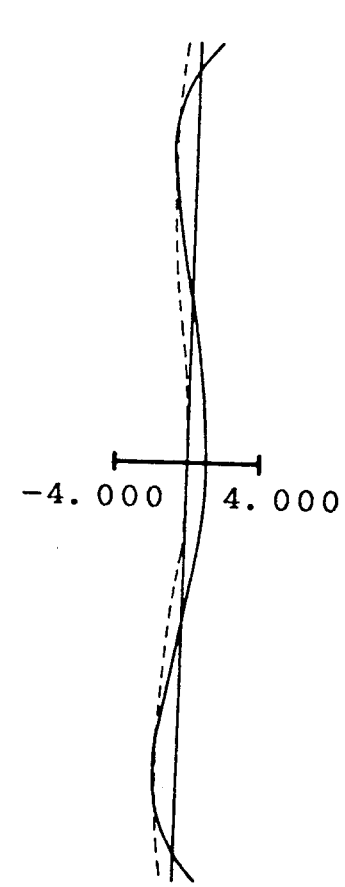
Figure 18:
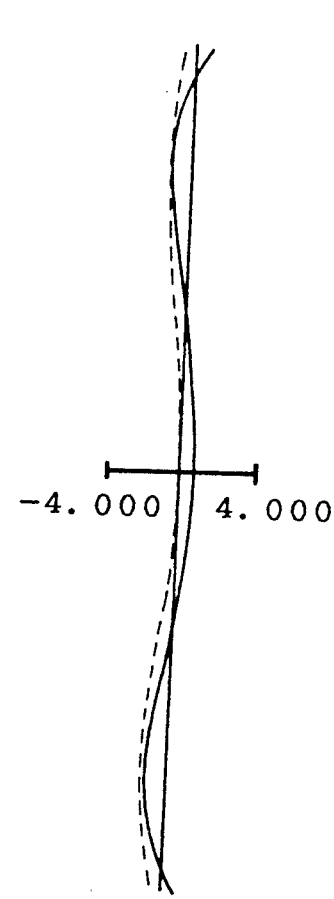
Figure 19:
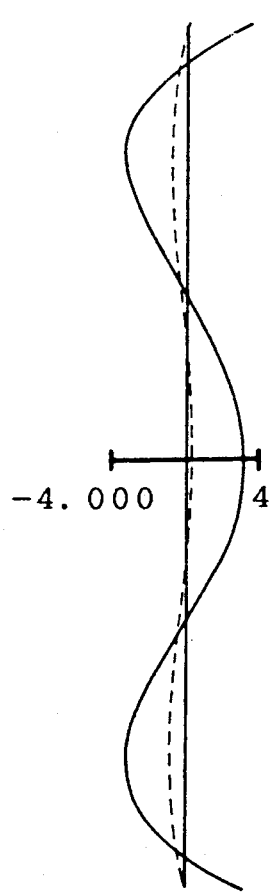
Figure 20:
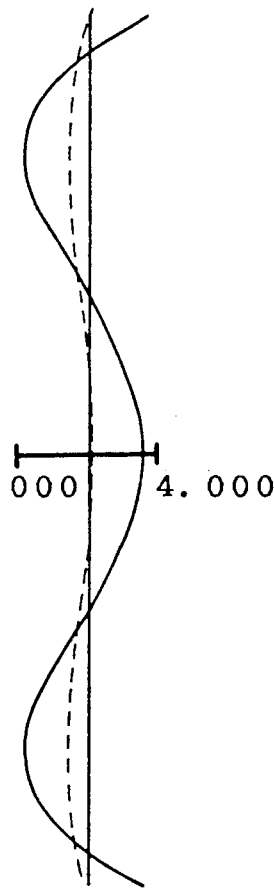
Figure 21:
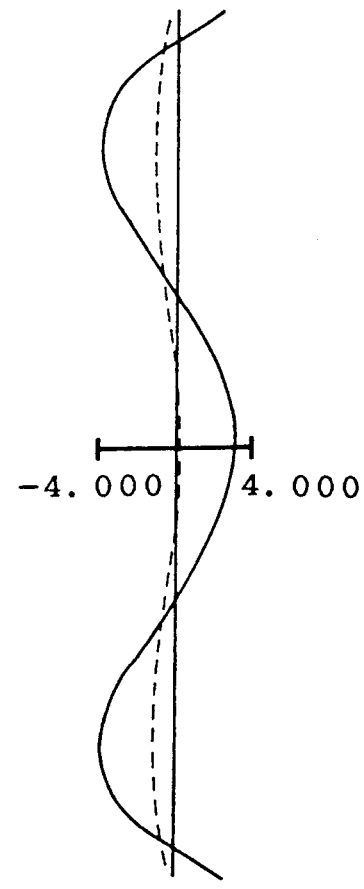

A description is given of a second preferred embodiment of the present invention. FIGS. 11A and 11B illustrate an optical system of a second preferred embodiment of the present invention. The illustrated optical system is expanded along an optical path of a main beam extending from an optical source to a scanned surface. FIG. 11A is viewed from the sub-scanning direction. In FIG. 11A, the main scanning direction corresponds to the up-down direction along a scanned surface 17. FIG. 11B is viewed from the main scanning direction. In FIG. 11B, the direction perpendicular to the drawing corresponds to the main scanning direction, and the up-down direction corresponds to the sub-scanning direction. The second embodiment of the present invention has an essential feature that a barrel toroidal lens 16 is used together with a singlet fθ lens 15, and a converging lens 12 is substituted for the collimating lens 2 shown in FIGS. 2A and 2B.

Referring to FIGS. 11A and 11B, a light source 11 is formed by a laser diode, a light-emitting diode or the like. In the following description, the light source 11 is formed by a laser diode. The light source 11 is disposed on an optical axis 0 on the object side of the converging lens 12. A divergent light flux from the light source 11 enters the converging lens 12.

The divergent light flux entering the converging lens 12 is converted into a converging light flux by the converging lens 12. If there is nothing on the image side of the converging lens 12, the light flux out of the converging lens 12 is imaged at a point Q' on an imaging plane 17A, namely, a natural converging point. A reference 14 is a schematic deflection surface of a deflection device, which is formed by a polygon mirror or a pyramidal mirror, for example. When the converging flux from the converging lens 12 passes through an aperture 18 and a cylindrical lens 13 and is then deflected on the deflection surface 14, the imaging point moves along a circular arc 19 in the plane which includes the main scanning direction. When the deflection device is a polygon mirror, the deflection starting point is slightly varied on the optical axis 0. Therefore, a locus of the imaging point does not absolutely form the circular arc 19 but an analogous shape.

The deflected light flux enters an optical scanning system, which includes the singlet fθ lens 15 and the barrel toroidal lens 16 arranged in this sequence from the deflection surface 14. The singlet fθ lens 15 has positive refracting power and further converges the incident converging flux due to the positive refracting power. The barrel toroidal lens 16 has strong positive refracting power in the sub-scanning direction, and cooperates with the singlet fθ lens 15 to form a spot-shaped image on the scanned surface 17 facing the barrel toroidal lens 16. When the light flux is deflected by the deflection device with a constant angular velocity, the spot-shaped imaging point moves in the main scanning direction on the scanned surface 17, and thereby scans the scanned surface 17. It will be seen from the above description that the combination of the of lens 15 and the barrel toroidal lens 16 has, as an object surface, a surface formed by the circular arc 19, and functions to form, on the scanned surface 17, an image on the object surface. In other words, in the main scanning corresponding direction, the fθ lens 15 and the barrel toroidal lens 16 cooperate with each other so as to couple the locus 19 and the scanned surface 17 with the conjugate relationship in view of geometrical optics.

The barrel toroidal lens 16 mainly functions to correct curvature of field in the same way as the aforementioned barrel toroidal lens 6 used in the first embodiment. In the second embodiment of FIGS. 11A and 11B, the barrel toroidal surface BT of the lens 16 is opposite to the singlet fθ lens 15. The barrel toroidal surface BT, which is included as a concave surface, plays an important role in correcting curvature of field particularly in the sub-scanning direction. The opposed surface of the barrel toroidal lens 16 opposite to the scanned surface 17 is a convex toroidal surface in the illustrated embodiment, and may be of an arbitrary surface shape.

Ten examples (examples 7 through 16) of the optical system depicted in FIGS. 11A and 11B are shown below. The same singlet fθ lens 15 having the following parameter values is used in 10 examples.

TABLE 9

| (fθ lens 15) | | | |
|---|---|---|---|
| $r_1$ | $r_2$ | $d_1$ | n |
| −160 | −60.219 | 15 | 1.57221 |

In table 9, $r_1$ is the radius of curvature of a first lens surface facing the deflection surface 14, $r_2$ is the radius of curvature of a second lens surface facing the barrel toroidal lens 16, $d_1$ is the lens thickness, and n is the refractive index. Further, the singlet fθ lens 15 used in the examples has the following parameter values. That is, the focal length f of the fθ lens 15 is equal to 160 mm, the distance D between the deflection surface 14 and the natural converging point Q' is set equal to 548.1 mm, and the distance $d_0$ between the deflection surface 14 and the first lens surface is set equal to 28.0 mm.

The following parameters are defined in respect of tens examples. L is the separation distance between the deflection surface 14 and the scanned surface 17. A parameter $d_2$ is the separation distance between the second lens surface of the singlet fθ lens 15 and the lens surface of the barrel toroidal lens 16 opposite to the the singlet fθ lens 15. A parameter $d_3$ is the lens thickness of the barrel toroidal lens 16. A parameter $d_4$ is the separation distance between the scanned surface 17 and the lens surface of the barrel toroidal lens 16 opposite thereto. A parameter n' is the refractive index of the barrel toroidal lens 16.

The barrel toroidal surface BT of the barrel toroidal lens 16 is defined by parameters $r_0$ and R, as described previously. A parameter $r_{kx}$ is the radius of curvature of the toroidal surface, which is the opposed surface of the barrel toroidal surface BT measured in the main scanning direction, and a parameter $r_{ky}$ is the radius of curvature of the toroidal surface in the sub-scanning direction. When suffix k is equal to 3, the toroidal surface faces the singlet fθ lens 15 (FIGS. 11A and 11B). When suffix k is equal to 4, the toroidal surface faces the scanned surface 17, as shown in FIGS. 12A and 12B. The barrel toroidal surface BT may be opposite to the scanned surface 17 or the fθ lens 15.

The following examples 7 to 15 relate to the arrangement where the barrel toroidal surface BT faces the singlet fθ lens 15, and example 16 relates to the arrangement where the barrel toroidal surface BT faces the scanned surface 17. In examples 7 to 16, the deflection angle is equal to 90 degrees, and the effective write width is approximately 226 mm. It follows that the present optical system is of an extremely wide field angle.

TABLE 10

| (Example 7) | | | | |
|---|---|---|---|---|
| L | $d_2$ | $d_3$ | $d_4$ | n' |
| 171 | 65 | 3 | 60 | 1.48519 |
| $r_{4x} = -275$, $r_{4y} = -12.23$, $r_0 = -30.0$, and R = −275. | | | | |

TABLE 11

| (Example 8) | | | | |
|---|---|---|---|---|
| L | $d_2$ | $d_3$ | $d_4$ | n' |
| 171 | 65 | 3 | 60 | 1.48519 |
| $r_{4x} = -600$, $r_{4y} = -10.33$, $r_0 = -20.0$, and R = −600. | | | | |

TABLE 12

| (Example 9) | | | | |
|---|---|---|---|---|
| L | $d_2$ | $d_3$ | $d_4$ | n' |
| 171 | 65 | 3 | 60 | 1.48519 |
| $r_{4x} = -1500$, $r_{4y} = -8.0$, $r_0 = -12.0$, and R = −1500. | | | | |

TABLE 13

| (Example 10) | | | | |
|---|---|---|---|---|
| L | $d_2$ | $d_3$ | $d_4$ | n' |
| 171 | 95 | 3 | 30 | 1.48519 |
| $r_{4x} = -530$, $r_{4y} = -7.94$, $r_0 = -20.0$, and R = −530. | | | | |

TABLE 14

| (Example 11) | | | | |
|---|---|---|---|---|
| L | $d_2$ | $d_3$ | $d_4$ | n' |
| 171 | 95 | 3 | 30 | 1.48519 |

TABLE 14-continued (Example 11)

| L | $d_2$ | $d_3$ | $d_4$ | n' |
|---|---|---|---|---|

$r_{4x} = -920$, $r_{4y} = -7.08$, $r_0 = -15.0$, and $R = -920$.

TABLE 15

(Example 12)

| L | $d_2$ | $d_3$ | $d_4$ | n' |
|---|---|---|---|---|
| 171 | 95 | 3 | 30 | 1.48519 |

$r_{4x} = -1400$, $r_{4y} = -6.42$, $r_0 = -12.0$, and $R = -1400$.

TABLE 16

(Example 13)

| L | $d_2$ | $d_3$ | $d_4$ | n' |
|---|---|---|---|---|
| 171 | 35 | 3 | 90 | 1.48519 |

$r_{4x} = -395$, $r_{4y} = -11.02$, $r_0 = -20.0$, and $R = -395$.

TABLE 17

(Example 14)

| L | $d_2$ | $d_3$ | $d_4$ | n' |
|---|---|---|---|---|
| 171 | 35 | 3 | 90 | 1.48519 |

$r_{4x} = -640$, $r_{4y} = -9.52$, $r_0 = -15.0$, and $R = -640$.

TABLE 18

(Example 15)

| L | $d_2$ | $d_3$ | $d_4$ | n' |
|---|---|---|---|---|
| 171 | 35 | 3 | 90 | 1.48519 |

$r_{4x} = -930$, $r_{4y} = -8.41$, $r_0 = -12.0$, and $R = -930$.

TABLE 19

(Example 16)

| L | $d_2$ | $d_3$ | $d_4$ | n' |
|---|---|---|---|---|
| 171 | 65 | 3 | 60 | 1.48519 |

$r_{4x} = 650$, $r_{4y} = 10.6$, $r_0 = 20.0$, and $R = 650$.

FIGS. 13 through 22 illustrate curvatures of field related to examples 7 through 16, respectively. In each of those figures, a solid line represents a curvature of field observed in the sub-scanning direction, and a broken line represents a curvature of field observed in the main scanning direction. It will be seen from FIGS. 13 through 22 that curvatures of field are effectively corrected. The linearity indicative of the fθ characteristics accounts for 9.2% or less. That is, since the linearity is optically corrected considerably, it is ease to electrically correct the linearity.

Comparison examples 2 and 3 are shown below. Comparison example 2 is an optical system obtained by replacing the barrel toroidal lens 16 used in the second embodiment with a conventional long cylindrical lens. Comparison example 3 is an optical system obtained by replacing the barrel toroidal lens 16 with a conventional long toroidal lens. In each of the comparison examples 2 and 3, the separation distance between the long lens and the scanned surface 17 is set equal to 60 mm. The following parameters are defined. Parameters $r_{3x}$ and $r_{3y}$ are radii of curvature of a lens surface of the long lens opposite to the fθ lens 15 relating to the main and sub scanning direction, respectively. Parameters $r_{4x}$ and $r_{4y}$ are radii of curvature of a lens surface of the long lens opposite to the scanned surface 17 relating to the main and sub scanning direction, respectively. A parameter $d_3$ is the lens thickness along the optical axis 0 thereof. A parameter n is the refractive index.

TABLE 20

(Comparison Example 2)

| L | $d_2$ | $d_3$ | $d_4$ | n |
|---|---|---|---|---|
| 171 | 65 | 3 | 60 | 1.48519 |

$r_{3x} = \infty$, $r_{3y} = 20.0$, $r_{4x} = \infty$, $r_{4y} = \infty$.

TABLE 21

(Comparison Example 3)

| L | $d_2$ | $d_3$ | $d_4$ | n |
|---|---|---|---|---|
| 171 | 65 | 3 | 60 | 1.48519 |

$r_{3x} = 150$, $r_{3y} = 20.0$, $r_{4x} = 150$, $r_{4y} = \infty$.

FIGS. 23 and 24 illustrate curvatures of field related to the above-mentioned comparison examples 2 and 3, respectively. The curvature of field in comparison example 2 is large in the sub-scanning direction. The curvature of field in comparison example 3 is slightly better than that for comparison example 2; however, an intermediate image height is not sufficiently corrected.

Figures 25A, 25B:
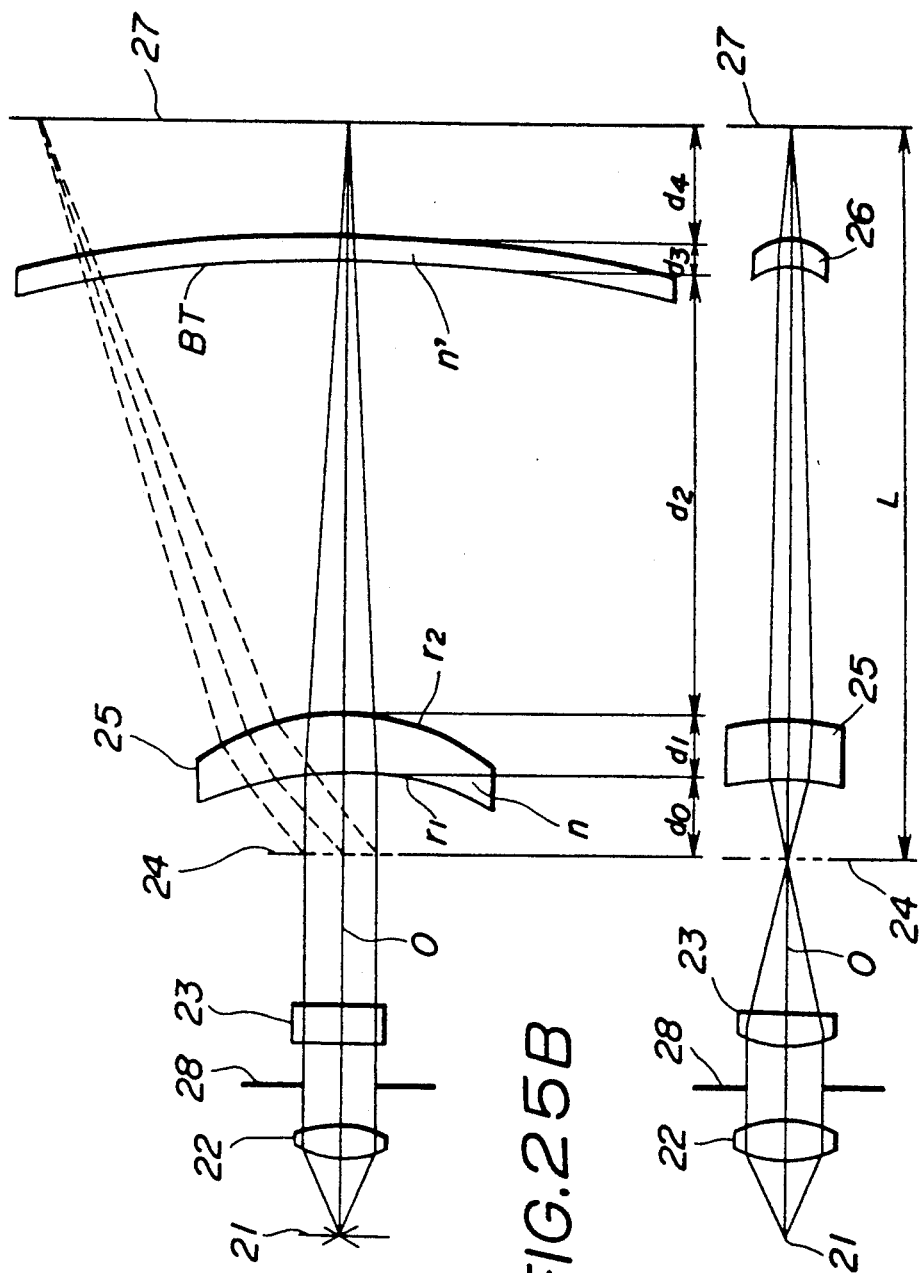
FIGS. 25A and 25B are expanded views of a third embodiment of the present invention.

A description is given of a third embodiment of the present invention. FIGS. 25A and 25B illustrate an optical system of a third preferred embodiment of the present invention. The illustrated optical system is expanded along an optical path of a main beam extending from an optical source to a scanned surface. FIG. 25A is viewed from the sub-scanning direction. In this figure, the main scanning direction corresponds to the up-down direction along a scanned surface 27. Therefore, the sub-scanning direction is the direction orthogonal to the drawing. FIG. 25B is viewed from the main scanning direction. In FIG. 25B, a direction perpendicular to the drawing corresponds to the main scanning direction, and the up-down direction corresponds to the sub-scanning direction. The third embodiment of the present invention has an essential feature that a barrel toroidal lens 26 is used together with a singlet fθ lens 25, and a collimating lens 22 is substituted for the collimating lens 2 shown in FIGS. 2A and 2B.

Referring to FIGS. 25A and 25B, a light flux emitted from an optical source 21 such as a laser diode or a light-emitting diode is collimated through the collimating lens 22. The shape in cross section of the collimated light flux is shaped by an aperture 28. Thereafter, the collimated light flux enters a cylindrical lens 23, which has positive power in the only sub-scanning direction. Therefore, the collimated light flux is provided with convergence properties in the sub-scanning direction. The cylindrical lens 23 is designed so that the light flux which converges in the only sub-scanning direction, forms a long ellipse image in the position of a deflection surface 24. The long direction of the above-mentioned long ellipse image corresponds to the main scanning direction. In the illustrated arrangement, the deflection surface 24 is provided by a polygon mirror.

The light flux deflected by the deflection surface 24 with a constant angular velocity enters the singlet fθ lens 25. The used singlet fθ lens 25 has positive refracting power. The light flux passing through the singlet fθ lens 25 enters the barrel toroidal lens 26, which functions to correct curvature of field in the sub-scanning direction. Finally, the light flux entering the fθ lens 25 is projected onto a scanned surface 27. The incident light flux on the scanned surface 27 is of a spot shape due to the cooperation of the fθ lens 25 and the barrel toroidal lens 26. The light flux entering the fθ lens 25 is a collimated flux, viewed from the sub-scanning direction. Therefore, in the main scanning direction, the geometrical optics conjugate relationship between infinity on the object side and the scanned surface 27 is established by the combination of the fθ lens 25 and the barrel toroidal lens 26. On the other hand, viewed from the main scanning direction, the light flux entering the fθ lens 25 is a divergent light flux from the long ellipse image formed on the deflection surface 24. Therefore, in the sub-scanning direction, the position of the deflection surface 24 and the position of the scanned surface 27 are coupled with the conjugate relationship in view of geometrical optics. The establishment of the conjugate relationship contributes to correct the facet pyramidal error of the deflection surface 24.

The barrel toroidal lens 26 has strong positive power in the sub-scanning direction. In the arrangement of FIGS. 25A and 25B, the barrel toroidal surface BT of the barrel toroidal lens 26 faces the fθ lens 25.

A description is given of six examples (examples 17 to 22) of the combination of the singlet fθ lens 25 and the barrel toroidal lens 26 relating to the third embodiment of the present invention. In each example, the same fθ lens 25 is used, and has the following parameter values.

TABLE 22

(Singlet fθ lens 25)

| $r_1$ | $r_2$ | $d_1$ | $n_1$ |
|---|---|---|---|
| −160 | −60.291 | 15 | 1.57221 |

In Table 22, a parameter $r_1$ is the radius of curvature of a lens surface of the singlet fθ lens 25 opposite to the deflection surface 24, and $r_2$ is the radius of curvature of a lens surface thereof opposite to the barrel toroidal lens 26. A parameter $d_1$ is the separation distance between the opposed lens surfaces of the fθ lens 25 and 26, and $n_1$ is the refractive index of a material forming the lens 25. Further, the used singlet fθ lens 25 has the following parameter values. That is, the separation distance $d_0$ between the lens surface of the fθ lens 25 opposite to the deflection surface 24 is set equal to 28.0 mm, and the focal length thereof is equal to 160 mm.

The following parameters are defined in each of the six barrel toroidal lenses to be combined with the above-mentioned singlet fθ lens 25. A parameter $d_2$ is the separation distance between the lens surface of the barrel toroidal lens 26 opposite to the singlet fθ lens 25 and the lens surface of the fθ lens 25 opposite to the barrel toroidal lens 26. A parameter $d_3$ is the lens thickness measured along the optical axis. A parameter $d_4$ is the separation distance between the scanned surface 27 and the lens surface of the barrel toroidal lens 26 opposite thereto. A parameter n is the refractive index of a material used for forming the barrel toroidal lens 26. The barrel toroidal surface BT of the barrel toroidal lens 26 is defined by parameters $r_0$ and R, as described previously. A parameter $r_{kx}$ is the radius of curvature of the opposed surface of the barrel toroidal lens 26 measured in the main scanning direction. Similarly, $r_{ky}$ is the radius of curvature of the opposed surface of the barrel toroidal lens 26 measured in the sub-scanning direction. When the opposed surface of the barrel toroidal lens 26 faces the deflection surface 24 (FIGS. 27A and 27B), k is equal to 3. When the opposed surface faces the scanned surface 27, k is equal to 4. That is, the barrel toroidal surface BT is directed so as to face either the fθ lens 25 or he scanned surface 27. A parameter L is the distance between the deflection surface 24 and the scanned surface 27. In the examples, 17 to 22, the deflection angle is equal to 76 degrees, and the effective write width is approximately 220 mm.

TABLE 23

(Example 17)

| L | $d_2$ | $d_3$ | $d_4$ | n' |
|---|---|---|---|---|
| 208.5 | 132.5 | 3.0 | 30.0 | 1.48519 |
| $r_{4x}$ | $r_{4y}$ | $r_0$ | R | |
| −900 | −7.55 | −17.20 | −900 | |

TABLE 24

(Example 18)

| L | $d_2$ | $d_3$ | $d_4$ | n' |
|---|---|---|---|---|
| 208.5 | 102.5 | 3.0 | 60.0 | 1.48519 |
| $r_{4x}$ | $r_{4y}$ | $r_0$ | R | |
| −700 | −11.33 | −23.20 | −700 | |

TABLE 25

(Example 19)

| L | $d_2$ | $d_3$ | $d_4$ | n' |
|---|---|---|---|---|
| 208.5 | 72.5 | 3.0 | 90.0 | 1.48519 |
| $r_{4x}$ | $r_{4y}$ | $r_0$ | R | |
| −500 | −12.95 | −24.90 | −500 | |

TABLE 26

(Example 20)

| L | $d_2$ | $d_3$ | $d_4$ | n' |
|---|---|---|---|---|
| 208.5 | 132.5 | 3.0 | 30.0 | 1.48519 |
| $r_{3x}$ | $r_{3y}$ | $r_0$ | R | |
| 900 | 9.50 | 29.00 | 900 | |

TABLE 27

(Example 21)

| L | $d_2$ | $d_3$ | $d_4$ | n' |
|---|---|---|---|---|
| 208.5 | 102.5 | 3.0 | 60.0 | 1.48519 |
| $r_{3x}$ | $r_{3y}$ | $r_0$ | R | |
| 700 | 12.1 | 25.00 | 700 | |

TABLE 28

(Example 22)

| L | $d_2$ | $d_3$ | $d_4$ | n' |
|---|---|---|---|---|
| 208.5 | 72.5 | 3.0 | 90.0 | 1.48519 |
| $r_{3x}$ | $r_{3y}$ | $r_0$ | R | |
| 500 | 13.15 | 25.00 | 500 | |

FIGS. 27 through 32 illustrate curvatures of field related to the above-mentioned examples 17 to 22. It can be seen from FIGS. 27 through 32 that the curvature of field increases with an increase of the distance $d_4$ between the barrel toroidal surface BT and the scanned surface 27. However, the observed curvature of field does not cause any serious problem to be overcome in practical use even when the distance $d_4$ is set equal to 90 mm.

Figures 33A, 33B:
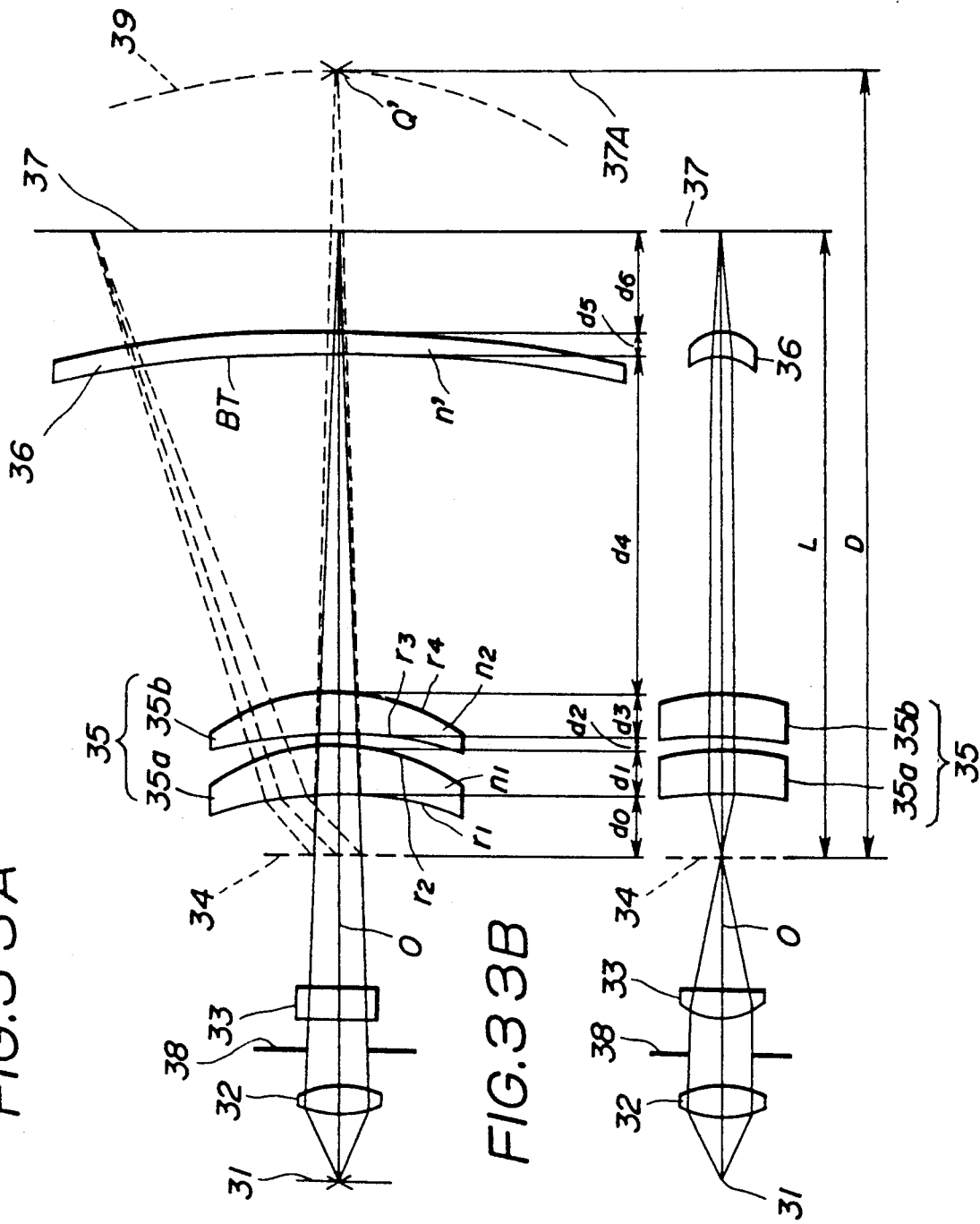
FIGS. 33A and 33B are expanded views of a fourth embodiment of the present invention.

A description is given of a fourth embodiment of the present invention. FIGS. 33A and 33B illustrate an optical system of a fourth preferred embodiment of the present invention. The illustrated optical system is expanded along an optical path of a main beam extending from an optical source to a scanned surface. FIG. 33A is viewed from the sub-scanning direction. In FIG. 33A, the main scanning direction corresponds to the up-down direction along a scanned surface 37. FIG. 33B is viewed from the main scanning direction. In FIG. 33B, the direction perpendicular to the drawing corresponds to the main scanning direction, and the up-down direction corresponds to the sub-scanning direction. The fourth embodiment of the present invention has an essential feature that a barrel toroidal lens 36 is used together with an fθ lens 35 consisting of two lenses 35a and 35b in place of the of lens 15 shown in FIGS. 11A and 11B.

Referring to FIGS. 33A and 33B, a light source 31 is formed by a laser diode, a light-emitting diode or the like. In the following description, the light source 31 is formed by a laser diode. The light source 31 is disposed on an optical axis 0 on the object side of the converging lens 32. A divergent light flux from the light source 31 enters the converging lens 32.

The divergent light flux entering the converging lens 32 is converted into a converging light flux thereby. If there is nothing on the image side of the converging lens 32, the light flux out of the converging lens 32 is imaged at a point Q' on an imaging plane 37A, namely, a natural converging point. A reference numeral 34 is a schematic deflection surface of a deflection device, which is formed by a polygon mirror or a pyramidal mirror, for example. When the converging flux from the converging lens 32 passes through an aperture 38 and a cylindrical lens 33 and is then deflected on the deflection surface 34, the imaging point moves along a circular arc 39. When the deflection device is a polygon mirror, the deflection starting point is slightly varied on the optical axis 0. Therefore, a locus of the imaging point does not absolutely form the circular arc 39 but a shape similar thereto.

The deflected light flux enters an optical scanning system, which includes the fθ lens 35 and the barrel toroidal lens 36 arranged in this sequence from the deflection surface 34. The fθ lens 15 consisting of two lenses 35a and 35b has positive refractive power in the main scanning direction, and thereby further converges the incident converging flux. The barrel toroidal lens 36 has strong positive refractive power in the sub-scanning direction, and cooperates with the fθ lens 35 to form a spot-shaped image on the scanned surface 37 facing the barrel toroidal lens 36. When the light flux is deflected by the deflection device with a constant angular velocity, the spot-shaped imaging point moves in the main scanning direction on the scanned surface 37, and thereby scans the scanned surface 37. It will be seen from the above description that the combination of the fθ lens 35 and the barrel toroidal lens 36 has, as an object surface, a surface formed by the circular arc 39, and functions to form, on the scanned surface 37, an image on the object surface. In other words, the fθ lens 35 and the barrel toroidal lens 36 cooperate with each other so as to approximately couple the locus 39 and the scanned surface 37 with the conjugate relationship in view of geometrical optics in the main scanning direction.

In the fourth embodiment of FIGS. 33A and 33B, the barrel toroidal surface BT of the lens 36 is opposite to the fθ lens 35. The barrel toroidal surface BT plays an important role in correcting curvature of field particularly in the sub-scanning direction. The opposed surface of the barrel toroidal lens 36 opposite to the scanned surface 37 is a convex toroidal surface in the illustrated embodiment, and may be of an arbitrary surface shape.

Four examples (examples 23 through 26) of the optical system depicted in FIGS. 33A and 33B are shown below. The same fθ lens 35 having the following parameter values is used in four examples.

TABLE 29

| | | (fθ lens 35) | | |
|---|---|---|---|---|
| i | $r_i$ | $d_i$ | j | $n_j$ |
| 1 | −250 | 12.7 | 1 | 1.51118 |
| 2 | −240 | 3.4 | | |
| 3 | −700 | 18.6 | 2 | 1.76605 |
| 4 | −99 | | | |

These values are calculated, assuming that the separation distance $d_0$ between the deflection surface 34 and the first lens surface of the lens 35a of the fθ lens 35 is equal to 26.0 mm, and the focal length of the fθ lens 35 is set equal to 143.73 mm. The distance D between the deflection surface 34 and the natural converging point Q' is equal to 500 mm. The fθ characteristic of the fθ lens 35 is equal to or less than ±0.5%, and therefore electrical correction of the linearity is unnecessary. The deflectron angle is equal to 100 degrees, and the effective write width is equal to 226 mm.

Figures 34A, 34B:
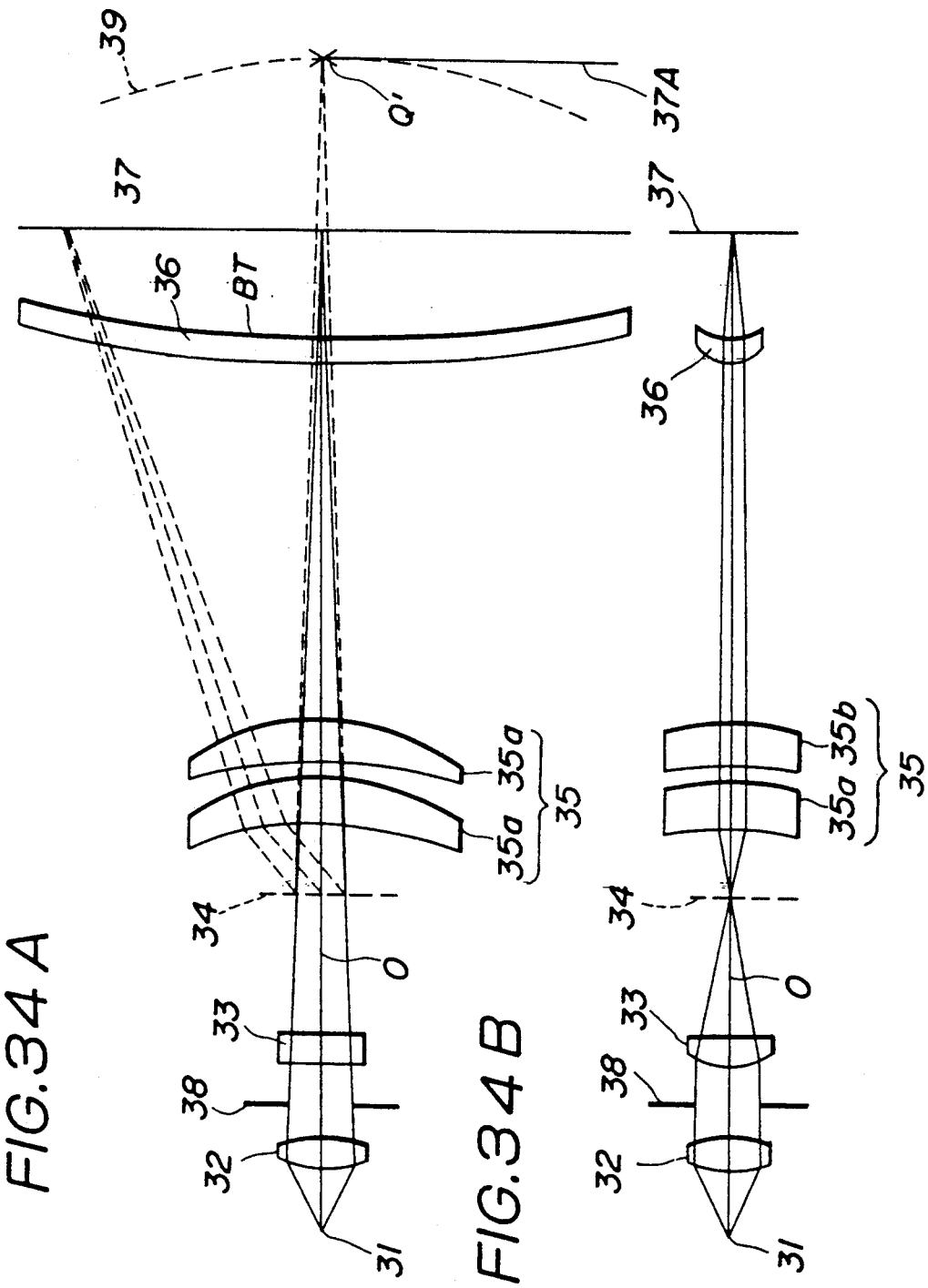
FIGS. 34A and 34B are expanded views of a variation of the fourth embodiment shown in FIGS. 33A and 33B.
Figure 35:
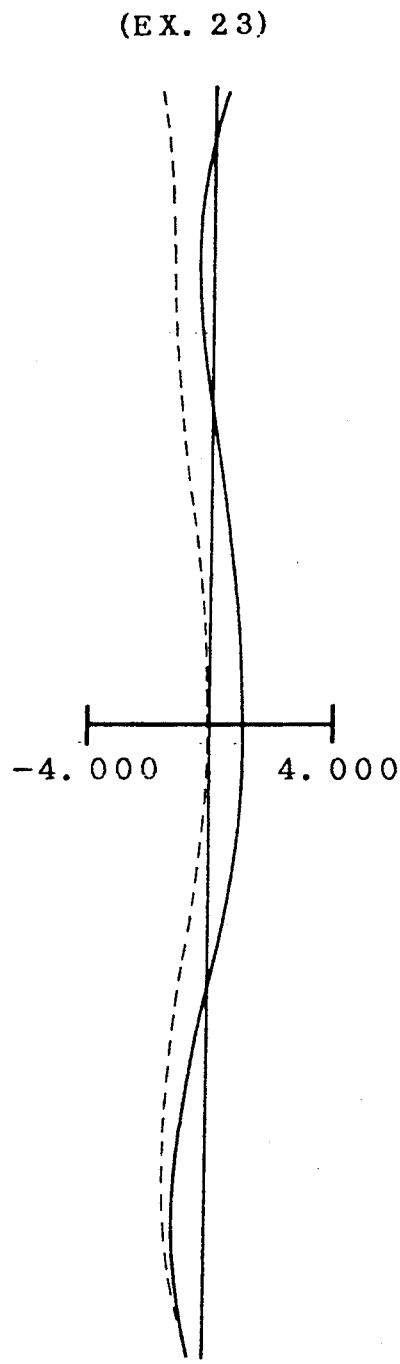
FIGS. 35 through 38 are graphs illustrating curvature of field observed in optical scanning systems constructed based on the fourth embodiment of the present invention.
Figure 36:
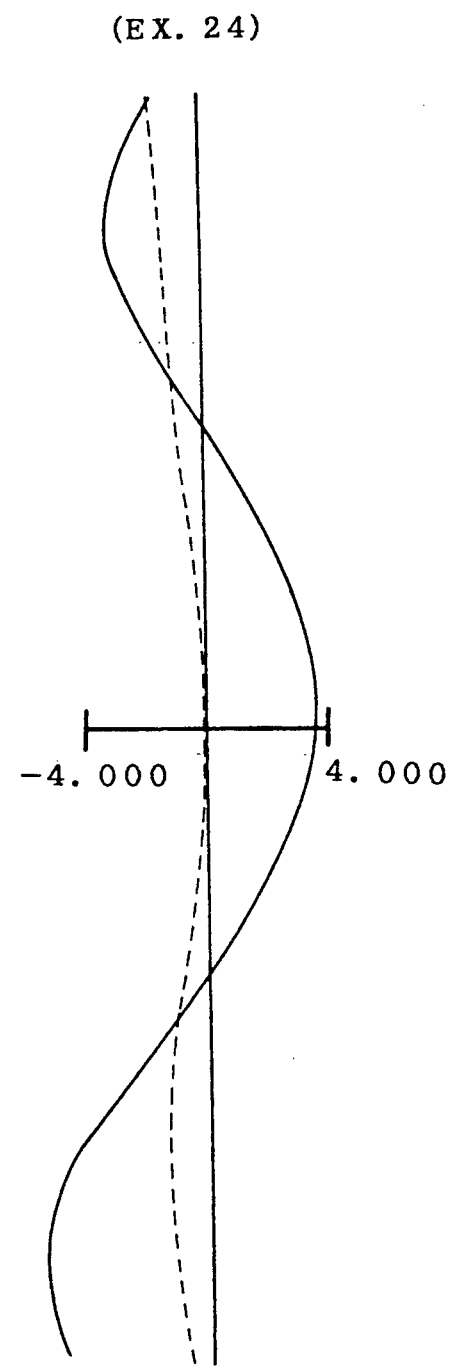
Figure 37:
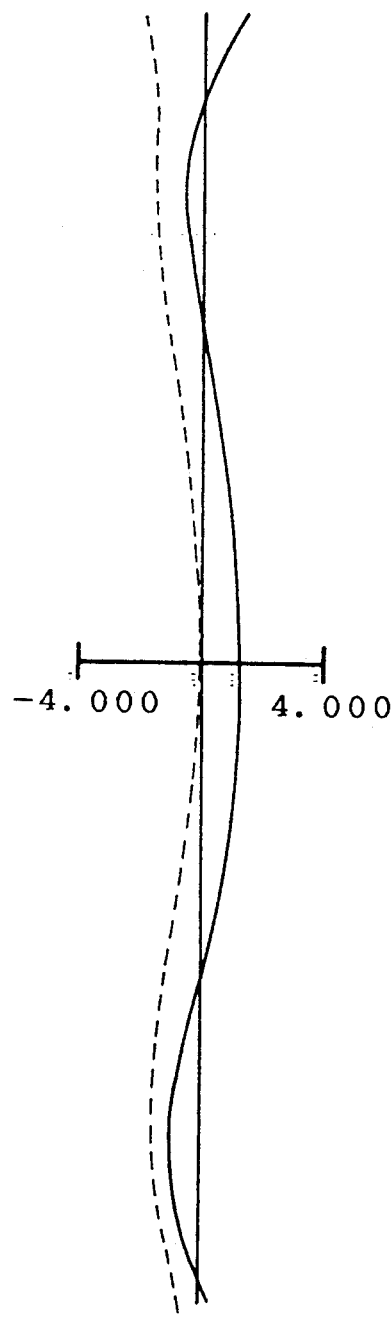
Figure 38:
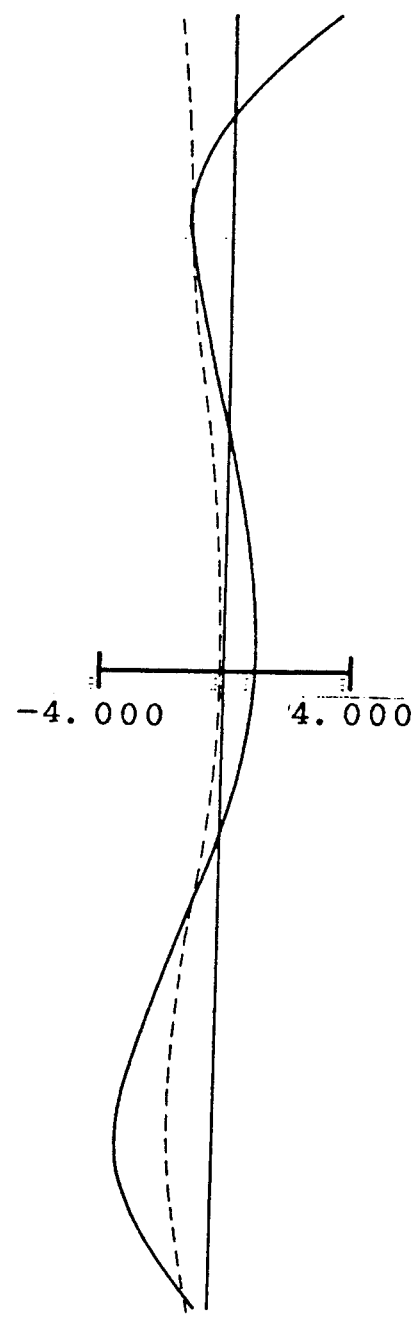

Four examples of the barrel toroidal lens 36 are shown in Tables 30 through 33. In these tables, L is the separation distance between the deflection surface 34 and the scanned surface 37, and $d_4$ is the separation distance between the fourth lens surface of the fθ lens 35 (that is, the lens surface of the second lens 35b opposite to the barrel toroidal lens 36) and the lens surface of the barrel toroidal lens 36 opposite to the fθ lens 35. Parameter $d_5$ is the thickness of the barrel toroidal lens 36, and $d_6$ is the separation distance between the scanned surface 37 and the lens surface of the barrel toroidal lens 36 opposite thereto. A parameter n' is the refractive index of a material of the barrel toroidal lens 36. The barrel toroidal surface BT is defined by the aforementioned parameters $r_0$ and R in formula (1). The radius of curvature of the opposed surface of the barrel toroidal lens 36 measured in the main scanning direction is represented as $r_{kx}$, and the radius of curvature thereof measured in the sub-scanning direction is represented by $r_{ky}$. When the barrel toroidal surface BT is opposite to the fθ lens 35, k = 6. On the other hand, k = 5, when the barrel toroidal surface BT of the barrel toroidal lens 36 faces the scanned surface 37, as shown in FIGS. 33A and 33B. Tables 30 and 31 relate to the arrangement of FIGS. 33A and 33B, and Tables 32 and 33 relate to the arrangement of FIGS. 34A and 34B. That is, the barrel toroidal surface BT may be directed so as to face the scanned surface 37 or the fθ lens 35.

TABLE 30

| | | (Example 23) | | |
|---|---|---|---|---|
| L | $d_4$ | $d_5$ | $d_6$ | n' |
| 168.5 | 75.0 | 3.0 | 30.0 | 1.48519 |
| $r_{5x}$ | $r_{5y}$ | $r_0$ | R | |
| 1500 | 8.00 | 17.00 | 1500 | |

TABLE 31

| | | (Example 24) | | |
|---|---|---|---|---|
| L | $d_4$ | $d_5$ | $d_6$ | n' |
| 168.5 | 45.0 | 3.0 | 60.0 | 1.48519 |
| $r_{5x}$ | $r_{5y}$ | $r_0$ | R | |
| 700 | 11.70 | 17.00 | 1500 | |

TABLE 32

(Example 25)

| L | $d_4$ | $d_5$ | $d_6$ | n' |
|---|---|---|---|---|
| 168.5 | 75.0 | 3.0 | 30.0 | 1.48519 |
| $r_0$ | R | $r_{5x}$ | $r_{6y}$ | |
| −15.40 | −1000 | −1000 | −7.20 | |

TABLE 33

(Example 26)

| L | $d_4$ | $d_5$ | $d_6$ | n' |
|---|---|---|---|---|
| 168.5 | 45.0 | 3.0 | 60.0 | 1.48519 |
| $r_0$ | R | $r_{5x}$ | $r_{6y}$ | |
| −12.85 | −1500 | −1500 | −8.30 | |

FIGS. 35 through 38 illustrate curvatures of field relating to examples 23 to 26, respectively. It can be seen from these figures that curvature of field is effectively suppressed even when the separation distance $d_6$ is set equal to 60 mm.

In each of the aforementioned first to third embodiments, it is preferable that $0.8 > d/f_M > 0.1$ is satisfied, where $f_M$ is the focal length in combination of the fθ lens and the barrel toroidal lens, in the main scanning direction, and d is the distance between the scanned plane and the surface of the barrel toroidal lens which is opposite to the scanned surface. If $d/f_M$ exceeds the upper limit of the above-mentioned condition, curvature of field appearing in the sub-scanning direction will increase, and causes the unevenness in the diameter of spot. On the other hand, if $d/f_M$ is smaller than the lower limit of the condition, it is necessary to use an aperture of a decreased size. This leads to a reduction in the utility efficiency of light.

In the fourth embodiment, it is preferable that $0.6 > d/f_M > 0.1$ is satisfied. The above-mentioned reasons with respect to the first to third embodiments hold true for the fourth embodiment.

Figure 39:
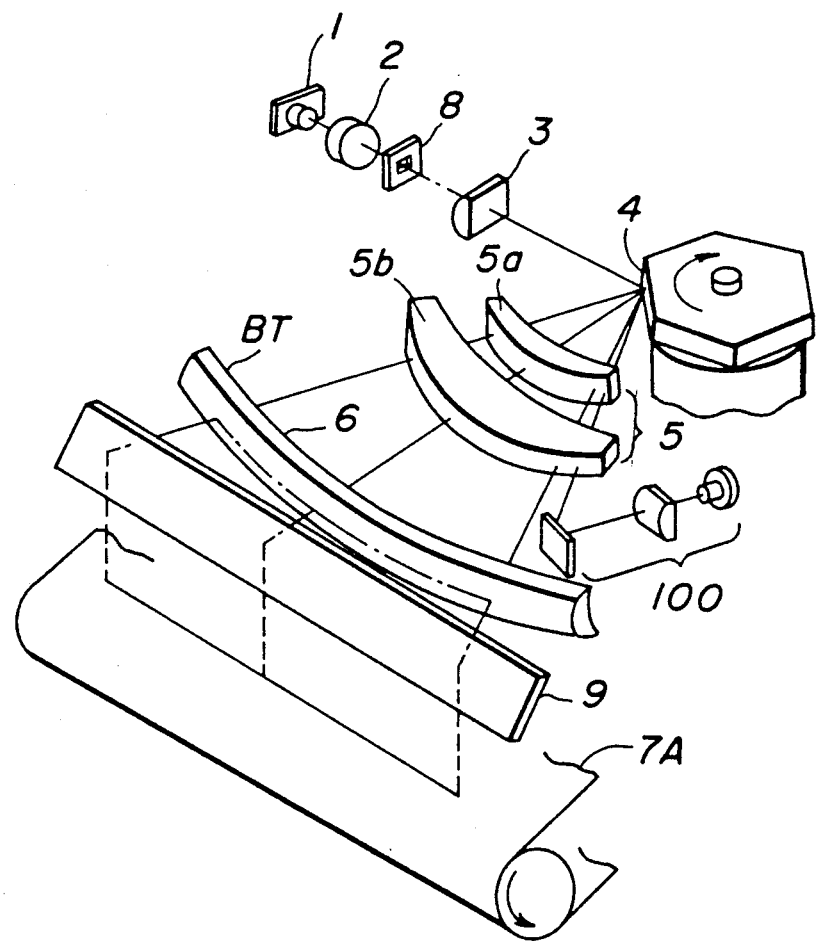
FIG. 39 is a perspective view of the present invention.

FIG. 39 is a perspective view of the first embodiment shown in FIGS. 2A and 2B. In FIG. 39, a reference numeral 9 is a mirror used for reflecting the light flux from the barrel toroidal lens 6. The reflected light flux is projected onto a light sensitive surface 7A serving as the scanned surface. A reference numeral 100 indicates a conventional synchronization detecting system used for establishing a synchronization for the optical scan.

The present invention is not limited to the aforementioned embodiments, and variations and modifications may be made without departing from the scope of the present invention.

What is claimed is:

1. An optical scanning system comprising:
   a light source means for emitting a light flux;
   a coupling lens means for coupling said light flux emitted from said light source means;
   a deflection means for deflecting said light flux from said coupling lens means in a main scanning direction;
   an optical scanning lens means for converging said deflected light flux so as to scan a surface with an approximately constant velocity in the main scanning direction; and
   a correcting lens means, cooperating with said optical scanning lens means, for further converging, on said scanned surface, said light flux from said optical scanning lens means in the main scanning direction and approximately coupling said deflection means and said scanned surface with a conjugate relationship in view of geometrical optics, said correcting lens means having an optical axis,
   said correcting lens means including a barrel toroidal surface in which the radius of curvature thereof measured in a sub-scanning direction perpendicular to the main scanning direction decreases with an increased distance from said optical axis of said correcting lens means in a direction parallel to the main scanning direction.

2. An optical scanning system as claimed in claim 1, wherein said coupling lens means is a collimating lens for collimating said light flux emitted from said light source means, and said optical scanning lens means is a doublet fθ lens.

3. An optical scanning system as claimed in claim 1, wherein said coupling lens means is a collimating lens for collimating said light flux emitted from said light source means, and said optical scanning lens means is a singlet fθ lens.

4. An optical scanning system as claimed in claim 1, wherein said coupling lens means is a converging lens for converging said light flux emitted from said light source means, and said optical scanning lens means is a singlet fθ lens.

5. An optical scanning system as claimed in claim 1, wherein said coupling lens means is a converging lens for converging said light flux emitted from said light source means, and said optical scanning lens means is a doublet fθ lens.

6. An optical scanning system as claimed in claim 1, wherein said barrel toroidal surface faces said optical scanning lens means.

7. An optical scanning system as claimed in claim 1, wherein said barrel toroidal surface faces said scanned surface.

8. An optical scanning system as claimed in claim 1, wherein said correcting lens means is a barrel toroidal lens having said barrel toroidal surface.

9. An optical scanning system as claimed in claim 1, wherein:
   said coupling lens means is a collimating lens for collimating said light flux emitted from said light source means, and said optical scanning lens means is a doublet fθ lens,
   said correcting lens means is a barrel toroidal lens having said barrel toroidal surface and an opposed surface opposite thereto, and
   $0.8 > d/f_M > 0.1$ is satisfied, where $f_M$ is the combined focal length in the main scanning direction of said optical scanning lens means and said correcting lens means, and d is the distance between said scanned surface and the surface of said barrel toroidal lens which is opposite to said scanned surface.

10. An optical scanning system as claimed in claim 9, wherein said opposed surface is a normal toroidal surface.

11. An optical scanning system as claimed in claim 1, wherein:
   said coupling lens means is a collimating lens for collimating said light flux emitted from said light source means, and said optical scanning lens means is a singlet fθ lens,
   said correcting lens means is a barrel toroidal lens having said barrel toroidal surface and an opposed surface opposite thereto, and
   $0.8 > d/f_M > 0.1$ is satisfied, where $f_M$ is the combined focal length in the main scanning direction of said optical scanning lens means and said correcting lens means, and d is the distance between said scanned surface the surface of said barrel toroidal lens which is opposite to said scanned surface.

12. An optical scanning system as claimed in claim 11, wherein said opposed surface is a normal toroidal surface.

13. An optical scanning system as claimed in claim 1, wherein:
said coupling lens means is a converging lens for converging said light flux emitted from said light source means, and said optical scanning lens means is a singlet $f\theta$ lens,
said correcting lens means is a barrel toroidal lens having said barrel toroidal surface and an opposed surface opposite thereto, and
$0.8 > d/f_M > 0.1$ is satisfied, where $f_M$ is the combined focal length in the main scanning direction of said optical scanning lens means and said correcting lens means, and d is the distance between said scanned surface and the surface of said barrel toroidal lens which is opposite to said scanned surface.

14. An optical scanning system as claimed in claim 13, wherein said opposed surface is a normal toroidal surface.

15. An optical scanning system as claimed in claim 1, wherein:
said coupling lens means is a converging lens for converging said light flux emitted from said light source means, and said optical scanning lens means is a doublet $f\theta$ lens,
said correcting lens means is a barrel toroidal lens having said barrel toroidal surface and an opposed surface opposite thereto, and
$0.6 > d/f_M > 0.1$ is satisfied, where $f_M$ is the combined focal length in the main scanning direction of said optical scanning lens means and said correcting lens means, and d is the distance between said scanned surface and the surface of said barrel toroidal lens which is opposite to said scanned surface.

16. An optical scanning system as claimed in claim 15, wherein said opposed surface is a normal toroidal surface.

17. An optical scanning system as claimed in claim 1, wherein said correcting lens means is a barrel toroidal lens having said barrel toroidal surface and an opposed surface opposite thereto, and wherein said barrel toroidal lens is formed of resin.

18. An optical scanning system as claimed in claim 1, wherein said correcting lens means is a barrel toroidal lens having said barrel toroidal surface and an opposed surface opposite thereto, and said opposed surface is a convex lens surface.

19. An optical scanning system as claimed in claim 1, wherein said deflection means includes a deflection surface to be coupled with said scanned surface by said conjugate relationship in view of geometrical optics.

20. An optical scanning system as claimed in claim 1, further comprising a beam shaping lens means for shaping said light flux from said coupling lens means.

21. An optical scanning system as claimed in claim 20, wherein said beam shaping lens means is a cylindrical lens.

22. An optical scanning system as claimed in claim 1, wherein said light source means includes a semiconductor laser diode.

23. An optical scanning system as claimed in claim 1, wherein said deflection means includes a rotary polygonal mirror.

24. An optical scanning system comprising;
a light source means for emitting a light flux;
a coupling lens means for coupling said light flux emitted from said light source means;
a deflection means for deflecting sad light flux from said coupling lens means in a main scanning direction;
an optical scanning lens means of converging said deflected light flux so as to scan a surface with an approximately constant velocity in the main scanning direction; and
a correcting lens means, cooperating with said optical scanning lens means, for further converging, on said scanned surface, said light flux from said optical scanning lens means in the main scanning direction and approximately coupling said deflection means and said scanned surface with a conjugate relationship in view of geometrical optics, said correcting lens means having an optical axis,
said correcting lens means including a normal barrel toroidal surface and a barrel toroidal surface in which the radius of curvature thereof measured in a sub-scanning direction perpendicular to the main scanning direction decreases with an increased distance form said optical axis of said correcting lens means in a direction parallel to the main scanning direction,
said barrel toroidal surface being formed by rotating an arc about an axis parallel to the main scanning direction,
and said barrel toroidal surface and said normal toroidal surface being arranged substantially parallel respectively.

25. An optical scanning system as claimed in claim 24, wherein said barrel toroidal surface faces said optical scanning lens means.

26. An optical scanning system as claimed in claim 24, wherein said barrel toroidal surface faces said scanned surface.

* * * * *